(12) United States Patent
Wasser

(10) Patent No.: US 10,937,036 B2
(45) Date of Patent: *Mar. 2, 2021

(54) DYNAMIC RECOMMENDATIONS TAKEN OVER TIME FOR RESERVATIONS OF INFORMATION TECHNOLOGY RESOURCES

(71) Applicant: Apptio, Inc., Bellevue, WA (US)

(72) Inventor: Michael Morris Wasser, Seattle, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,503

(22) Filed: Jun. 13, 2013

(65) Prior Publication Data

US 2014/0136269 A1 May 15, 2014

Related U.S. Application Data

(63) Continuation of application No. 13/675,837, filed on Nov. 13, 2012, now abandoned.

(51) Int. Cl.
*G06Q 30/02* (2012.01)
*G06Q 10/04* (2012.01)
(Continued)

(52) U.S. Cl.
CPC ............ *G06Q 30/02* (2013.01); *G06Q 10/02* (2013.01); *G06Q 10/04* (2013.01); *G06Q 10/0639* (2013.01); *G06Q 10/06312* (2013.01)

(58) Field of Classification Search
CPC .... G06Q 10/0639; G06Q 10/06; G06Q 10/10; G06Q 30/02; G06Q 10/00; G06Q 40/04;
(Continued)

(56) References Cited

U.S. PATENT DOCUMENTS 4,744,026 A 5/1988 Vanderbei
5,249,120 A 9/1993 Foley
(Continued)

FOREIGN PATENT DOCUMENTS

JP 2011134268 A 7/2011

OTHER PUBLICATIONS

US 5,649,211 A, 04/1997, Horkin et al. (withdrawn)
(Continued)

*Primary Examiner* — Octavian Rotaru
(74) *Attorney, Agent, or Firm* — John W. Branch; Branch Partners PLLC

(57) ABSTRACT

Embodiments are directed towards providing dynamic recommendations of reserving information technology resources over time that may be visually displayed over that time. In one embodiment, the recommendations may be determined based on an analysis of actual usage data obtained over a prior time period and used to predict future resource demands. The subject innovations enable a user to dynamically perform various 'what-if' analysis to determine optimum purchase times, and configurations. In some embodiments, the user is further provided information about currently purchased resource under-utilizations to enable the user to redistribute work, release resources, or take other actions directed towards improving management of their IT budget. While subject innovations are may be directed towards managing IT resources obtained through one or more cloud computing service providers, some embodiments further allow the user to perform make/buy decisions such as when to use in-house resources versus using cloud-based resources.

15 Claims, 7 Drawing Sheets

(51) Int. Cl.
   *G06Q 10/02* (2012.01)
   *G06Q 10/06* (2012.01)

(58) Field of Classification Search
   CPC ......... G06F 17/30442; G06F 17/30463; G06F 9/461
   USPC .......... 705/7.38, 7.37, 30; 707/719; 718/108
   See application file for complete search history.

(56) References Cited

U.S. PATENT DOCUMENTS

| | | | |
|---|---|---|---|
| 5,615,121 A | 3/1997 | Babayev et al. | |
| 5,619,211 A | 4/1997 | Horkin et al. | |
| 5,721,919 A | 2/1998 | Morel et al. | |
| 5,758,327 A | 5/1998 | Gardner et al. | |
| 5,799,286 A * | 8/1998 | Morgan | G06Q 10/0631 705/30 |
| 5,802,508 A | 9/1998 | Morgenstern | |
| 5,903,453 A | 5/1999 | Stoddard, II | |
| 5,970,476 A | 10/1999 | Fahey | |
| 5,991,741 A | 11/1999 | Speakman et al. | |
| 6,014,640 A | 1/2000 | Bent | |
| 6,032,123 A | 2/2000 | Jameson | |
| 6,047,290 A | 4/2000 | Kennedy et al. | |
| 6,208,993 B1 | 3/2001 | Shadmon | |
| 6,249,769 B1 | 6/2001 | Ruffin et al. | |
| 6,253,192 B1 | 6/2001 | Corlett et al. | |
| 6,308,166 B1 | 10/2001 | Breuker et al. | |
| 6,321,207 B1 | 11/2001 | Ye | |
| 6,330,552 B1 | 12/2001 | Farrar et al. | |
| 6,424,969 B1 | 7/2002 | Gruenwald | |
| 6,336,138 B1 | 12/2002 | Caswell et al. | |
| 6,507,825 B2 | 1/2003 | Suh | |
| 6,578,005 B1 * | 6/2003 | Lesaint | G06Q 10/06 705/7.14 |
| 6,594,672 B1 | 7/2003 | Lampson et al. | |
| 6,647,370 B1 | 11/2003 | Fu et al. | |
| 6,738,736 B1 | 5/2004 | Bond | |
| 6,789,252 B1 | 9/2004 | Burke et al. | |
| 6,832,212 B1 | 12/2004 | Zenner et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,965,867 B1 | 11/2005 | Jameson | |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 | 12/2006 | Munoz et al. | |
| 7,177,850 B2 | 2/2007 | Argenton et al. | |
| 7,263,527 B1 | 8/2007 | Malcom | |
| 7,305,491 B2 | 12/2007 | Miller et al. | |
| 7,308,427 B1 * | 12/2007 | Hood | G06Q 40/00 705/35 |
| 7,321,869 B1 | 1/2008 | Phibbs, Jr. | |
| 7,386,535 B1 | 6/2008 | Kalucha et al. | |
| 7,418,438 B2 | 9/2008 | Gould et al. | |
| 7,505,888 B2 | 3/2009 | Legault et al. | |
| 7,590,937 B2 | 9/2009 | Jacobus et al. | |
| 7,634,431 B2 | 12/2009 | Stratton | |
| 7,653,449 B2 | 1/2010 | Hunter et al. | |
| 7,664,729 B2 | 2/2010 | Klein et al. | |
| 7,703,003 B2 | 4/2010 | Payne et al. | |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,761,548 B2 | 7/2010 | Snyder et al. | |
| 7,769,654 B1 | 8/2010 | Hurewitz | |
| 7,774,458 B2 | 8/2010 | Trinon et al. | |
| 7,783,759 B2 * | 8/2010 | Eilam | H04L 67/1012 709/226 |
| 7,801,755 B2 | 9/2010 | Doherty et al. | |
| 7,805,400 B2 | 9/2010 | Teh et al. | |
| 7,813,948 B2 | 10/2010 | Ratzloff | |
| 7,852,711 B1 | 12/2010 | Fitzgerald et al. | |
| 7,870,051 B1 | 1/2011 | En et al. | |
| 7,877,742 B2 | 1/2011 | Duale et al. | |
| 7,899,235 B1 | 3/2011 | Williams et al. | |
| 7,917,555 B2 | 3/2011 | Gottumukkala et al. | |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1 | 6/2011 | Capelli et al. | |
| 7,966,266 B2 | 6/2011 | Delvat | |
| 8,010,584 B1 | 8/2011 | Craver et al. | |
| 8,024,241 B2 * | 9/2011 | Bailey | G06Q 30/0206 705/35 |
| 8,073,724 B2 | 12/2011 | Harthcryde et al. | |
| 8,121,959 B2 | 2/2012 | Delvat | |
| 8,175,863 B1 * | 5/2012 | Ostermeyer | G06F 11/3409 703/22 |
| 8,195,524 B2 | 6/2012 | Sandholm et al. | |
| 8,195,785 B2 | 6/2012 | Snyder et al. | |
| 8,200,518 B2 | 6/2012 | Bailey et al. | |
| 8,200,561 B1 | 6/2012 | Scott et al. | |
| 8,209,218 B1 | 6/2012 | Basu et al. | |
| 8,214,829 B2 | 7/2012 | Neogi et al. | |
| 8,260,959 B2 * | 9/2012 | Rudkin | H04L 12/14 709/241 |
| 8,370,243 B1 | 2/2013 | Cernyar | |
| 8,396,775 B1 | 3/2013 | Mindlin | |
| 8,423,428 B2 | 4/2013 | Grendel et al. | |
| 8,484,355 B1 * | 7/2013 | Lochhead | G06F 9/5072 709/226 |
| 8,533,904 B2 | 9/2013 | Conrad | |
| 8,543,438 B1 | 9/2013 | Fleiss | |
| 8,600,830 B2 | 12/2013 | Hoffberg | |
| 8,601,263 B1 | 12/2013 | Shankar et al. | |
| 8,606,827 B2 | 12/2013 | Williamson | |
| 8,655,714 B2 | 2/2014 | Weir et al. | |
| 8,667,385 B1 | 3/2014 | Mui et al. | |
| 8,766,981 B2 | 7/2014 | McLachlan et al. | |
| 8,768,976 B2 | 7/2014 | McLachlan et al. | |
| 8,826,230 B1 | 9/2014 | Michelsen | |
| 8,935,301 B2 | 1/2015 | Chmiel et al. | |
| 8,937,618 B2 | 1/2015 | Erez et al. | |
| 8,970,476 B2 | 3/2015 | Chan | |
| 8,993,552 B2 | 3/2015 | Munkes et al. | |
| 9,015,692 B1 | 4/2015 | Clavel | |
| 9,020,830 B2 | 4/2015 | Purpus et al. | |
| 9,104,661 B1 | 8/2015 | Evans | |
| 9,213,573 B2 | 12/2015 | French et al. | |
| 9,268,964 B1 | 2/2016 | Schepis et al. | |
| 9,281,012 B2 | 3/2016 | Hedges | |
| 9,384,511 B1 | 7/2016 | Purpus | |
| 9,529,863 B1 | 12/2016 | Gindin et al. | |
| 9,805,311 B1 | 10/2017 | Mohler | |
| 10,152,722 B2 | 12/2018 | Heath | |
| 2002/0002557 A1 | 1/2002 | Straube et al. | |
| 2002/0016752 A1 | 2/2002 | Suh | |
| 2002/0056004 A1 | 5/2002 | Smith | |
| 2002/0069102 A1 | 6/2002 | Vellante et al. | |
| 2002/0082966 A1 | 6/2002 | O'Brien et al. | |
| 2002/0087441 A1 | 7/2002 | Wagner, Jr. et al. | |
| 2002/0107914 A1 | 8/2002 | Charisius et al. | |
| 2002/0123945 A1 | 9/2002 | Booth et al. | |
| 2002/0129342 A1 * | 9/2002 | Kil | G06F 16/2465 717/137 |
| 2002/0145040 A1 | 10/2002 | Grabski | |
| 2002/0154173 A1 * | 10/2002 | Etgen | G06F 3/04855 715/833 |
| 2002/0156710 A1 | 10/2002 | Ryder | |
| 2002/0174006 A1 | 11/2002 | Rugge et al. | |
| 2002/0174049 A1 | 11/2002 | Kitahara | |
| 2002/0178198 A1 | 11/2002 | Steele | |
| 2002/0194329 A1 | 12/2002 | Alling | |
| 2003/0019350 A1 | 1/2003 | Khosla | |
| 2003/0033191 A1 | 3/2003 | Davies et al. | |
| 2003/0074269 A1 | 4/2003 | Viswanath | |
| 2003/0083388 A1 | 5/2003 | L'Alloret | |
| 2003/0083888 A1 | 5/2003 | Argenton et al. | |
| 2003/0083912 A1 | 5/2003 | Covington et al. | |
| 2003/0093310 A1 | 5/2003 | Macrae | |
| 2003/0110113 A1 | 6/2003 | Martin | |
| 2003/0139960 A1 | 7/2003 | Nishikawa et al. | |

(56) References Cited

U.S. PATENT DOCUMENTS

| | | |
|---|---|---|
| 2003/0139986 A1 | 7/2003 | Roberts, Jr. |
| 2003/0158724 A1 | 8/2003 | Uchida |
| 2003/0158766 A1 | 8/2003 | Mital et al. |
| 2003/0172018 A1 | 9/2003 | Chen et al. |
| 2003/0172368 A1 | 9/2003 | Alumbaugh et al. |
| 2003/0195780 A1 | 10/2003 | Arora et al. |
| 2003/0208493 A1 | 11/2003 | Hall et al. |
| 2003/0217033 A1 | 11/2003 | Sandler et al. |
| 2003/0233301 A1 | 12/2003 | Chen et al. |
| 2003/0236721 A1 | 12/2003 | Plumer et al. |
| 2004/0030628 A1 | 2/2004 | Takamoto et al. |
| 2004/0039685 A1 | 2/2004 | Hambrecht et al. |
| 2004/0059611 A1 | 3/2004 | Kananghinis et al. |
| 2004/0059679 A1 | 3/2004 | Mizumachi et al. |
| 2004/0073477 A1 | 4/2004 | Heyns et al. |
| 2004/0093344 A1 | 5/2004 | Berger et al. |
| 2004/0111509 A1* | 6/2004 | Eilam ............... H04L 67/1029 709/224 |
| 2004/0133876 A1 | 7/2004 | Sproule |
| 2004/0138942 A1 | 7/2004 | Pearson et al. |
| 2004/0186762 A1 | 9/2004 | Beaven et al. |
| 2004/0243438 A1 | 12/2004 | Mintz |
| 2004/0249737 A1 | 12/2004 | Tofte |
| 2005/0004856 A1 | 1/2005 | Brose et al. |
| 2005/0033631 A1 | 2/2005 | Wefers et al. |
| 2005/0037326 A1 | 2/2005 | Kuntz et al. |
| 2005/0038788 A1 | 2/2005 | Dettinger et al. |
| 2005/0044224 A1 | 2/2005 | Jun et al. |
| 2005/0060298 A1 | 3/2005 | Agapi et al. |
| 2005/0060317 A1 | 3/2005 | Lott et al. |
| 2005/0071285 A1 | 3/2005 | Laicher et al. |
| 2005/0091102 A1 | 4/2005 | Retsina |
| 2005/0120032 A1 | 6/2005 | Liebich et al. |
| 2005/0131870 A1 | 6/2005 | Krishnaswarny et al. |
| 2005/0131929 A1 | 6/2005 | Bailey |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1 | 11/2005 | Gabelmann et al. |
| 2006/0010156 A1 | 1/2006 | Netz et al. |
| 2006/0010294 A1 | 1/2006 | Pasumansky et al. |
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1 | 5/2006 | Johanson et al. |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1* | 7/2006 | Yakov ............... H05K 3/3421 705/26.1 |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1* | 9/2006 | Jackson ............... G06F 9/5061 709/226 |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0259468 A1 | 11/2006 | Brooks et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzberg et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0129892 A1 | 6/2007 | Smartt et al. |
| 2007/0185785 A1 | 8/2007 | Carlson et al. |
| 2007/0198390 A1 | 8/2007 | Lazear et al. |
| 2007/0198982 A1 | 8/2007 | Bolan et al. |
| 2007/0179975 A1 | 9/2007 | Teh et al. |
| 2007/0198317 A1 | 9/2007 | Harthcryde et al. |
| 2007/0214413 A1 | 9/2007 | Boeckenhauer |
| 2007/0226064 A1 | 9/2007 | Yu et al. |
| 2007/0226090 A1 | 9/2007 | Stratton |
| 2007/0233439 A1 | 10/2007 | Carroll et al. |
| 2007/0260532 A1 | 11/2007 | Blake, III |
| 2007/0265896 A1 | 11/2007 | Smith |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1 | 1/2008 | Bruckner et al. |
| 2008/0033774 A1* | 2/2008 | Kimbrel ............... H04L 67/1002 705/7.25 |
| 2008/0059945 A1 | 3/2008 | Sauer et al. |
| 2008/0060058 A1 | 3/2008 | Shea et al. |
| 2008/0065435 A1 | 3/2008 | Ratzloff |
| 2008/0071844 A1 | 3/2008 | Gopal |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 9/2008 | Lymbery et al. |
| 2008/0221949 A1 | 9/2008 | Delurgio et al. |
| 2008/0222638 A1 | 9/2008 | Beaty et al. |
| 2008/0239393 A1 | 10/2008 | Navon |
| 2008/0255912 A1 | 10/2008 | Christiansen et al. |
| 2008/0295096 A1* | 11/2008 | Beaty ............... G06F 9/5077 718/1 |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1 | 1/2009 | Bailey et al. |
| 2009/0018996 A1 | 1/2009 | Hunt et al. |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 8/2009 | Tsern et al. |
| 2009/0198535 A1 | 8/2009 | Brown et al. |
| 2009/0199192 A1 | 8/2009 | Laithwaite et al. |
| 2009/0210275 A1 | 8/2009 | Andreev et al. |
| 2009/0216580 A1 | 8/2009 | Bailey et al. |
| 2009/0222742 A1 | 9/2009 | Pelton et al. |
| 2009/0234892 A1 | 9/2009 | Anglin et al. |
| 2009/0300173 A1* | 12/2009 | Bakman ............... H04L 41/147 709/224 |
| 2009/0307597 A1 | 12/2009 | Bakman |
| 2009/0319316 A1 | 12/2009 | Westerfeld et al. |
| 2010/0005014 A1 | 1/2010 | Castle et al. |
| 2010/0005173 A1* | 1/2010 | Baskaran ............... G06F 9/5066 709/226 |
| 2010/0017344 A1 | 1/2010 | Hambrecht et al. |
| 2010/0042455 A1 | 2/2010 | Liu et al. |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1* | 5/2010 | Tung ............... H04L 41/5096 709/200 |
| 2010/0153282 A1 | 6/2010 | Graham |
| 2010/0161371 A1 | 6/2010 | Cantor et al. |
| 2010/0161634 A1 | 6/2010 | Caceres |
| 2010/0169477 A1* | 7/2010 | Stienhans ............... G06F 9/5083 709/224 |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |

(56) References Cited

U.S. PATENT DOCUMENTS

| | | |
|---|---|---|
| 2010/0250421 A1 | 9/2010 | Ariff et al. |
| 2010/0250642 A1* | 9/2010 | Yellin ................ G06F 11/3409 709/201 |
| 2010/0293163 A1 | 11/2010 | McLachlan et al. |
| 2010/0299233 A1 | 11/2010 | Licardi et al. |
| 2010/0306382 A1* | 12/2010 | Cardosa ............. G06F 9/45541 709/226 |
| 2010/0323754 A1 | 12/2010 | Nakagawa |
| 2010/0325506 A1 | 12/2010 | Cai et al. |
| 2010/0325606 A1 | 12/2010 | Sundararajan et al. |
| 2010/0332262 A1* | 12/2010 | Horvitz .................. G06Q 30/06 705/4 |
| 2010/0333109 A1 | 12/2010 | Milnor |
| 2011/0016214 A1* | 1/2011 | Jackson ................ G06F 9/505 709/226 |
| 2011/0016448 A1 | 1/2011 | Bauder et al. |
| 2011/0022861 A1* | 1/2011 | Agneeswaran ....... G06F 9/5077 713/310 |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1 | 5/2011 | Moroze |
| 2011/0167034 A1 | 7/2011 | Knight et al. |
| 2011/0196795 A1 | 8/2011 | Pointer |
| 2011/0225277 A1* | 9/2011 | Freimuth ............ G06F 9/45558 709/223 |
| 2011/0238608 A1 | 9/2011 | Sathish |
| 2011/0261049 A1 | 10/2011 | Cardno et al. |
| 2011/0295766 A1 | 12/2011 | Tompkins |
| 2011/0313947 A1 | 12/2011 | Grohavaz |
| 2012/0016811 A1 | 1/2012 | Jones |
| 2012/0023170 A1 | 1/2012 | Matignon et al. |
| 2012/0066020 A1* | 3/2012 | Moon .................... G06Q 10/10 705/7.28 |
| 2012/0116990 A1 | 5/2012 | Huang |
| 2012/0131591 A1* | 5/2012 | Moorthi .................. H04L 67/10 718/104 |
| 2012/0150736 A1 | 6/2012 | Dickerson et al. |
| 2012/0232947 A1 | 9/2012 | McLachlan |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0246046 A1 | 9/2012 | Hirsch |
| 2012/0272234 A1 | 10/2012 | Kaiser et al. |
| 2012/0330869 A1 | 12/2012 | Durham |
| 2013/0014057 A1* | 1/2013 | Reinpoldt ........... G06F 3/04847 715/833 |
| 2013/0028537 A1 | 1/2013 | Miyake et al. |
| 2013/0041792 A1 | 2/2013 | King et al. |
| 2013/0041819 A1 | 2/2013 | Khasho |
| 2013/0060595 A1 | 3/2013 | Bailey |
| 2013/0066866 A1 | 3/2013 | Chan et al. |
| 2013/0091456 A1 | 4/2013 | Sherman et al. |
| 2013/0091465 A1 | 4/2013 | Kikin-Gil et al. |
| 2013/0103369 A1 | 4/2013 | Huynh et al. |
| 2013/0103654 A1 | 4/2013 | McLachlan et al. |
| 2013/0124454 A1 | 5/2013 | Bhide et al. |
| 2013/0124459 A1 | 5/2013 | Iwase et al. |
| 2013/0138470 A1 | 5/2013 | Goyal et al. |
| 2013/0159926 A1 | 6/2013 | Vainer et al. |
| 2013/0173159 A1 | 7/2013 | Trum et al. |
| 2013/0179371 A1* | 7/2013 | Jain ...................... G06F 9/5027 705/400 |
| 2013/0201193 A1 | 8/2013 | McLachlan |
| 2013/0227584 A1 | 8/2013 | Greene et al. |
| 2013/0268307 A1 | 10/2013 | Li et al. |
| 2013/0282537 A1 | 10/2013 | Snider |
| 2013/0290470 A1 | 10/2013 | CaraDonna et al. |
| 2013/0293551 A1 | 11/2013 | Erez et al. |
| 2013/0339274 A1 | 12/2013 | Willis et al. |
| 2013/0346390 A1* | 12/2013 | Jerzak .................. G06F 16/144 707/719 |
| 2014/0006222 A1 | 1/2014 | Hericks et al. |
| 2014/0067632 A1 | 3/2014 | Curtis |
| 2014/0075004 A1 | 3/2014 | Van Dusen et al. |
| 2014/0089509 A1 | 3/2014 | Akolkar et al. |
| 2014/0108295 A1 | 4/2014 | Renshaw |
| 2014/0122374 A1 | 5/2014 | Hacigumus et al. |
| 2014/0129583 A1 | 5/2014 | Munkes et al. |
| 2014/0136295 A1 | 5/2014 | Wasser |
| 2014/0143175 A1 | 5/2014 | Greenshields et al. |
| 2014/0172918 A1 | 6/2014 | Kornmann et al. |
| 2014/0229212 A1 | 8/2014 | MacElheron et al. |
| 2014/0244364 A1 | 8/2014 | Evers |
| 2014/0252095 A1 | 9/2014 | Kikin |
| 2014/0257928 A1 | 9/2014 | Chen et al. |
| 2014/0278459 A1 | 9/2014 | Morris |
| 2014/0279121 A1 | 9/2014 | George et al. |
| 2014/0279201 A1 | 9/2014 | Iyoob et al. |
| 2014/0279676 A1 | 9/2014 | Schafer et al. |
| 2014/0279947 A1 | 9/2014 | Chachra et al. |
| 2014/0288987 A1 | 9/2014 | Liu |
| 2014/0310233 A1 | 10/2014 | Catalano et al. |
| 2014/0006085 A1 | 11/2014 | McLachlan et al. |
| 2014/0337007 A1 | 11/2014 | Waibel et al. |
| 2014/0351166 A1 | 11/2014 | Schlossberg |
| 2014/0365503 A1 | 12/2014 | Franceschini et al. |
| 2014/0365504 A1 | 12/2014 | Franceschini et al. |
| 2015/0006552 A1 | 1/2015 | Lord |
| 2015/0012328 A1 | 1/2015 | McLachlan et al. |
| 2015/0046363 A1 | 2/2015 | McNamara et al. |
| 2015/0066808 A1 | 3/2015 | Legare et al. |
| 2015/0074075 A1 | 3/2015 | Alexander |
| 2015/0088584 A1 | 3/2015 | Santiago, III et al. |
| 2015/0120370 A1 | 4/2015 | Agrawal et al. |
| 2015/0149257 A1 | 5/2015 | Bielat et al. |
| 2015/0227991 A1 | 8/2015 | Yu |
| 2015/0278024 A1 | 10/2015 | Barman et al. |
| 2015/0294273 A1 | 10/2015 | Barraci et al. |
| 2015/0302303 A1 | 10/2015 | Hakim |
| 2015/0341230 A1 | 11/2015 | Dave et al. |
| 2015/0363725 A1 | 12/2015 | Andersson et al. |
| 2015/0379061 A1 | 12/2015 | Paraschivescu |
| 2016/0063577 A1 | 3/2016 | Yellin et al. |
| 2016/0098234 A1 | 4/2016 | Weaver et al. |
| 2016/0266594 A1 | 9/2016 | Kauffman et al. |
| 2017/0102246 A1 | 4/2017 | Yang |
| 2017/0154088 A1 | 6/2017 | Sherman |
| 2018/0068246 A1 | 3/2018 | Crivat et al. |

OTHER PUBLICATIONS

Vizard Michael, Free Service from Apptio Tracks Cloud Service Provider Pricing, IT business edge, Dec. 12, 2012 http://www.itbusinessedge.com/blogs/it-unmasked/free-service-from-apptio-tracks-cloud-service-provider-pricing.html.*

Talbot Chris, Apptio Cloud Express Provides Free Usage Tracking Service, talkincloud, Dec. 12, 2012 http://talkincloud.com/cloud-computing-management/apptio-cloud-express-provides-free-usage-tracking-service.*

Morgan Timothy, Apptio puffs up freebie cost control freak for public clouds, The Register, Dec. 12, 2012 http://www.theregister.co.uk/2012/12/12/apptio_cloud_express/.*

Riknas Mikael, Apptio unveils tool to keep track of cloud costs, Computerworld Dec. 12, 2012 http://www.computerworld.com/s/article/9234630/Apptio_unveils_tool_to_keep_track_of_cloud_costs.*

Accenture Sustainability Cloud Computing the Environmental Benefits of Moving to the Cloud, archives org, Aug. 13, 2011 http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.*

Amazon Elastic Compute Cloud, Amazon EC2, archives org, Oct. 21, 2011 http://web.archive.org/web/20111029130914/http://aws.amazon.com/ec2/#pricing.*

Automated Cost Transparency, Apptio 2008 http://www.cio.com/documents/whitepapers/AutomatedCostTransparency.pdf.*

Apptio Optimizes Enterprise IT Costs Utilizing Amazon Web Services Cloud Computing, Apprio, Apr. 7, 2009 http://www.apptio.

(56) References Cited

OTHER PUBLICATIONS com/news/apptio-optimizes-enterprise-it-costs-utilizing-amazon-web-services-cloud-computing#.Ukm5XsX7Lco.*
Apptio Extends Leadership in Cloud Business Management with Launch of Apptio Cloud Express, Apptio, Dec. 12, 2012 http://www.apptio.com/news/apptio-extends-leadership-cloud-business-management-launch-apptio-cloud-express#.Ukm4r8X7Lco.*
Visualization for Production Management Treemap and Fisheye Table Browser open-video organization webpages 2001 http://www.open-video.org/details.php?videoid=4547.*
Robinson Glen, Cloud Economics—Cost Optimization (selected slides), Amazon Web Services AWS, Slideshare webpages Feb. 28, 2012 http://www.slideshare.net/AmazonWebServices/whats-new-with-aws-london.*
Amazon Reserved Instances, Amazon Web Services, archives org, Jan. 14, 2012 http://web.archive.org/web/20120114153849/http://aws.amazon.com/rds/reserved-instances/?.*
Cost Optimisation with Amazon Web Services, extracted slides, Slideshare Jan. 30, 2012 http://www.slideshare.net/AmazonWebServices/cost-optimisation-with-amazon-web-services?from_search=1.*
Deciding an Approach to the Cloud AWS Reserved Instances, Cloudyn webpages, Feb. 28, 2012 https://www.cloudyn.com/blog/deciding-an-approach-to-the-cloud-aws-reserved-instances/.*
Ganesan Harish, Auto Scaling using AWS, Amazon Web Services AWS (selected slides), Apr. 20, 2011 http://www.slideshare.net/harishganesan/auto-scaling-using-amazon-web-services-aws.*
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.*
Skilton et al, Building Return on Investment from Cloud Computing, The Open Group Whitepaper, mladina webpages, Apr. 2010 http://www.mladina.si/media/objave/dokumenti/2010/5/31/31_5_2010_open_group_building_return_on_investment_from_cloud_computing.pdf.*
Ward Miles, Optimizing for Cost in the Cloud (selection), AWS Summit, Slideshare Apr. 20, 2012 http://www.slideshare.net/AmazonWebServices/optimizing-your-infrastructure-costs-on-aws.*
Efficient frontier—Wikipedia, Efficient frontier, Wikipedia webpages, Oct. 30, 2016 https://en.wikipedia.org/wiki/Efficient_frontier.*
"Notice from the European Patent Office dated Oct. 1, 2007 concerning business methods," Official Journal EPO, Nov. 2007, pp. 592-593.
"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.
"Project Management," Wikipedia, the free encyclopedia, accessed Mar. 13, 2012, 14 pages http://en.wikipedia.org/wiki/Project_management—last modified Mar. 7, 2012.
Extended European Search Report in EP Application No. 13151967.0-1955, dated Apr. 19, 2013.
International Search Report and Written Opinion for International Patent Application No. PCT/US2010/035021 dated Jul. 14, 2010.
International Preliminary Report on Patentability for International Patent Application No. PCT/US2010/035021 dated Nov. 24, 2011.
International Search Report and Written Opinion for International Patent Application No. PCT/US2012/028353 dated Oct. 31, 2012.
International Search Report and Written Opinion for International Patent Application No. PCT/US2012/028378 dated Sep. 12, 2012.
Official Communication for U.S. Appl. No. 12/467,120 dated Oct. 4, 2011.
Official Communication for U.S. Appl. No. 12/467,120 dated Jun. 20, 2012.
Official Communication for U.S. Appl. No. 12/467,120 dated Aug. 29, 2012.
Official Communication for U.S. Appl. No. 12/467,120 dated Mar. 26, 2013.
Official Communication for U.S. Appl. No. 13/324,253 dated Sep. 25, 2012.
Official Communication for U.S. Appl. No. 13/324,253 dated Jan. 10, 2013.
Official Communication for U.S. Appl. No. 13/324,253 dated Mar. 19, 2013.
Official Communication for U.S. Appl. No. 13/452,628 dated Apr. 22, 2013.
"Activity Based Costing is the best allocation methodology," APPTIO, Community for Technology Business Management, Mar. 16, 2010, 2 pages.
"IT Cost Transparency and Apptio," Dec. 4, 2008, 2 pages http://web.archive.org/web/20081204012158/http://www.apptio.com/solutions.
Busch, J., "Six Strategies for IT Cost Allocation," Spend Matters, Jan. 5, 2011, 3 pages http://spendmatters.com/2011/01/05/six-strategies-for-it-cost-allocation/.
International Preliminary Report on Patentability for International Patent Application No. PCT/US2012/028353 dated Sep. 19, 2013.
International Preliminary Report on Patentability for International Patent Application No. PCT/US2012/028378 dated Sep. 19, 2013.
Official Communication for U.S. Appl. No. 12/467,120 dated Oct. 23, 2013.
Official Communication for U.S. Appl. No. 13/324,253 dated Sep. 6, 2013.
Official Communication for U.S. Appl. No. 13/415,797 dated Oct. 3, 2013.
Official Communication for U.S. Appl. No. 13/452,628 dated Nov. 18, 2013.
Official Communication for U.S. Appl. No. 13/837,815 dated Oct. 23, 2013.
Official Communication for U.S. Appl. No. 13/917,478 dated Nov. 7, 2013.
Official Communication for U.S. Appl. No. 13/935,147 dated Oct. 22, 2013.
Official Communication for U.S. Appl. No. 13/675,837 dated Oct. 10, 2013.
Official Communication for U.S. Appl. No. 13/452,628 dated Mar. 13, 2014.
Office Communication for U.S. Appl. No. 13/452,628 dated Mar. 30, 2015 (18 pages).
European Search Report for Application No. 12755613.2 dated Jan. 26. 2015 (6 pages).
Office Communication for U.S. Appl. No. 14/180,308 dated Jan. 30, 2015.
Office Communication for U.S. Appl. No. 13/837,815 dated Sep. 25, 2014.
Official Communication for U.S. Appl. No. 13/324,253 dated Jan. 23, 2014.
Official Communication for U.S. Appl. No. 13/675,837 dated Jan. 31, 2014.
Extended European Search Report in EP Application No. 14159413.5 dated Jul. 4, 2014.
International Search Report and Written Opinion for Application PCT/US2012/028353 dated Mar. 8, 2012.
Official Communication for U.S. Appl. No. 14/180,308 dated Apr. 8, 2014.
Official Communication for U.S. Appl. No. 14/180,308 dated Sep. 2, 2014.
Office Communication for U.S. Appl. No. 14/033,130 dated Aug. 5, 2014.
Office Communication for U.S. Appl. No. 14/033,130 dated May 27, 2014.
Office Communication for U.S. Appl. No. 13/935,147 dated Jun. 16, 2014.
Office Communication for U.S. Appl. No. 13/935,147 dated Apr. 11, 2014.
Office Communication for U.S. Appl. No. 13/675,837 dated Jan. 31, 2014.
SAS Activity-Based Management, 2010, Fact Sheet, 4 pages.
Office Communication for U.S. Appl. No. 13/415,797 dated Apr. 9, 2014.

(56) References Cited

OTHER PUBLICATIONS

Office Communication for U.S. Appl. No. 13/324,253 dated Apr. 9, 2014.
Office Communication for U.S. Appl. No. 13/324,253 dated Oct. 24, 2014.
Office Communication for U.S. Appl. No. 13/365,150 dated Dec. 3, 2014.
Office Communication for U.S. Appl. No. 13/452,628 dated Oct. 1, 2014.
Office Communication for U.S. Appl. No. 13/415,797 dated Jan. 12, 2015.
Office Communication for U.S. Appl. No. 13/837,815 dated Apr. 7, 2014.
Office Communication for U.S. Appl. No. 13/675,837 dated Apr. 2, 2014.
Office Communication for U.S. Appl. No. 13/949,019 dated Feb. 10, 2015.
Office Communication for U.S. Appl. No. 13/324,253 dated Feb. 19, 2015.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Official Communication for U.S. Appl. No. 14/033,130 dated Dec. 16, 2013.
Office Communication for U.S. Appl. No. 14/180,308 dated Apr. 17, 2015.
Office Communication for U.S. Appl. No. 13/675,837 dated Apr. 16, 2015.
Office Communication for U.S. Appl. No. 13/837,815 dated Apr. 27, 2015.
Office Communication for U.S. Appl. No. 13/452,628 dated Jun. 23, 2015.
Office Communication for U.S. Appl. No. 13/649,019 dated Sep. 23, 2015.
Office Communication for U.S. Appl. No. 13/365,150 dated Sep. 24, 2015.
Office Communication for U.S. Appl. No. 14/033,130 dated Sep. 15, 2015.
Office Communication for U.S. Appl. No. 13/415,797 dated Jul. 23, 2015.
International Search Report and Written Opinion for PCT/US2015/015486 dated Jun. 29, 2015.
Office Communication for U.S. Appl. No. 13/935,147 dated Jul. 9, 2015.
European Examination Report for Application No. 14159413.5 dated Jul. 15, 2015, 9 pages.
Office Communication for U.S. Appl. No. 13/415,701 dated Oct. 27, 2015, 16 pages.
David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Official Communication for U.S. Appl. No. 14/846,349 dated Jul. 1, 2016, 24 pages.
Official Communication for U.S. Appl. No. 14/981,747 dated Jul. 14, 2016, 29 pages.
Office Communication for U.S. Appl. No. 14/722,663 dated Dec. 1, 2015, 37 pages.
Chien-Liana Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
Official Communication for U.S. Appl. No. 14/846,349 dated Dec. 17, 2015, 23 pages.
Official Communication for U.S. Appl. No. 13/649,019 dated Jan. 4, 2016, 8 pages.
Official Communication for U.S. Appl. No. 13/452,628 dated Jan. 12, 2016, 21 pages.
Official Communication for U.S. Appl. No. 14/869,721 dated Jan. 13, 2016, 57 pages.
Official Communication for U.S. Appl. No. 14/033,130 dated Feb. 18, 2016, 22 pages.
Official Communication for U.S. Appl. No. 13/935,147 dated Mar. 9, 2016, 10 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 7 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.
Office Communication for U.S. Appl. No. 14/867,552, dated Apr. 25, 2016, 12 pages.
Office Communication for U.S. Appl. No. 14/033,130, dated Apr. 25, 2016, 4 pages.
Office Communication for U.S. Appl. No. 14/971,944, dated May 19, 2016, 17 pages.
Stephen Muller and Hasso Platner, "An IN-Depth Analysis of Data Aggregation Cost Factors in a Columnar In-Memory Database", ACM DOLAP'12, Nov. 2, 2012, Maui, Hawaii, USA, pp. 65-72.
Official Communication for U.S. Appl. No. 14/869,721 dated Jun. 1, 2016, 35 pages.
Official Communication for U.S. Appl. No. 14/977,368 dated Jun. 7, 2016, 11 pages.
Official Communication for U.S. Appl. No. 13/837,815 dated Jun. 23, 2016, 3 pages.
Office Communication for U.S. Appl. No. 13/675,837 dated Oct. 26, 2015, 20 pages.
Official Communication for U.S. Appl. No. 13/637,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Office Communication for U.S. Appl. No. 13/415,797 dated Oct. 19, 2015.
Office Communication for U.S. Appl. No. 13/837,815 dated Sep. 28, 2015.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 14/867,552 dated Oct. 3, 2016, 19 pages.
Official Communication for U.S. Appl. No. 14/180,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.

(56) References Cited

OTHER PUBLICATIONS

Official Communication for U.S. Appl. No. 13/415,797 dated Jan. 11, 2017, 25 pages.
Official Communication for U.S. Appl. No. 13/675,837 dated Jan. 11, 2017, 29 pages.
Official Communication for U.S. Appl. No. 15/351,313 dated Jan. 12, 2017, 7 pages.
Official Communication for U.S. Appl. No. 14/867,552 dated Jan. 9, 2017, 3 pages.
Official Communication for U.S. Appl. No. 14/033,130 dated Jan. 11, 2017, 12 pages.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 13/415,797 dated Apr. 14, 2017, 3 pages.
Official Communication for U.S. Appl. No. 13/365,150 dated May 22, 2017, 3 pages.
Official Communication for U.S. Appl. No. 13/365,150 dated Aug. 23, 2017, 30 pages.
Official Communication for U.S. Appl. No. 14/869,721 dated May 5, 2017, 49 pages.
Official Communication for U.S. Appl. No. 14/981,747 dated May 19, 2017, 43 pages.
Official Communication for U.S. Appl. No. 15/271,013 dated May 24, 2017, 37 pages.
Official Communication for U.S. Appl. No. 14/180,308 dated May 25, 2017, 21 pages.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 15/351,313 dated Jul. 18, 2017, 15 pages.
Official Communication for U.S. Appl. No. 15/260,221 dated Aug. 15, 2017, 21 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for U.S. Appl. No. 13/935,147 dated Nov. 3, 2017, 11 pages.
Official Communication for U.S. Appl. No. 14/846,349 dated Nov. 20, 2017, 3 pages.
Official Communication for U.S. Appl. No. 13/365,150 dated May 22, 2017.
Official Communication for U.S. Appl. No. 13/365,150 dated Aug. 23, 2017.
Official Communication for U.S. Appl. No. 14/869,721 dated May 5, 2017.
Official Communication for U.S. Appl. No. 14/981,747 dated May 19, 2017.
Official Communication for U.S. Appl. No. 15/271,013 dated May 24, 2017.
Official Communication for U.S. Appl. No. 14/180,308 dated May 25, 2017.
Official Communication for U.S. Appl. No. 15/379,267 dated Jun. 30, 2017.
Official Communication for U.S. Appl. No. 14/867,552 dated Jun. 29, 2017.
Official Communication for U.S. Appl. No. 13/837,815 dated Jun. 12, 2017.
Official Communication for U.S. Appl. No. 15/351,313 dated Jul. 18, 2017.
Official Communication for U.S. Appl. No. 15/260,221 dated Aug. 15, 2017.
Official Communication for European Application No. 13151967.0 dated Aug. 18, 2017.
European Search Report for European Application No. 10775648.8 dated Mar. 10, 2017.
Official Communication for European Application No. 12755613.2 dated Aug. 17, 2017.
Official Communication for U.S. Appl. No. 14/033,130 dated Sep. 7, 2017.
Official Communication for U.S. Appl. No. 14/846,349 dated Sep. 8, 2017.
Official Communication for U.S. Appl. No. 13/452,628 dated Sep. 28, 2017.
Official Communication for U.S. Appl. No. 13/837,815 dated Sep. 28, 2017.
Official Communication for U.S. Appl. No. 13/415,797 dated Sep. 7, 2017.
Official Communication for U.S. Appl. No. 14/869,721 dated Oct. 17, 2017.
Official Communication for U.S. Appl. No. 15/379,267 dated Oct. 6, 2017.
Official Communication for U.S. Appl. No. 13/935,147 dated Nov. 3, 2017.
Official Communication for U.S. Appl. No. 14/846,349 dated Nov. 20, 2017.
Official Communication for U.S. Appl. No. 14/180,308 dated Dec. 22, 2017.
Official Communication for U.S. Appl. No. 15/271,013 dated Dec. 27, 2017.
Official Communication for U.S. Appl. No. 15/260,221 dated Jan. 9, 2018.
Official Communication for U.S. Appl. No. 15/379,267 dated Jan. 2, 2018.
Official Communication for U.S. Appl. No. 15/351,313 dated Jan. 8, 2018.
Official Communication for U.S. Appl. No. 14/846,349 dated Jan. 18, 2018.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.

(56) References Cited

OTHER PUBLICATIONS

Official Communication for U.S. Appl. No. 14/846,349 dated Jan. 18, 2018, 29 pages.
Official Communication for U.S. Appl. No. 13/837,815 dated Jan. 26, 2018, 12 pages.
Official Communication for U.S. Appl. No. 14/869,721 dated Jan. 19, 2018, 3 pages.
Official Communication for U.S. Appl. No. 14/667,552 dated Feb. 13, 2018, 3 pages.
Official Communication for U.S. Appl. No. 15/859,008 dated Mar. 5, 2018, 20 pages.
Official Communication for U.S. Appl. No. 13/935,147 dated Jan. 17, 2018, 3 pages.
Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 13/935,147 dated Aug. 10, 2018, pp. 1-25.
Official Communication for U.S. Appl. No. 14/033,130 dated Aug. 9, 2018, pp. 1-47.
Official Communication for U.S. Appl. No. 14/180,308 dated Aug. 6, 2018, pp. 1-23.
Official Communication for U.S. Appl. No. 15/858,945 dated Sep. 10, 2018, pp. 1-25.
Official Communication for U.S. Appl. No. 13/837,815 dated Apr. 5, 2018, pp. 1-4.
Official Communication for U.S. Appl. No. 14/867,552 dated May 31, 2018, pp. 1-22.
Official Communication for U.S. Appl. No. 14/869,721 dated May 11, 2018, pp. 1-33.
Official Communication for U.S. Appl. No. 15/351,313 dated Jun. 4, 2018, pp. 1-9.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 14/846,349 dated Jul. 20, 2018.
Official Communication for U.S. Appl. No. 14/981,747 dated Jul. 5, 2018.
Official Communication for U.S. Appl. No. 15/271,013 dated Jul. 6, 2018.
Official Communication for U.S. Appl. No. 15/379,267 dated Jul. 19, 2018.
Official Communication for U.S. Appl. No. 13/935,147 dated Aug. 10, 2018.
Official Communication for U.S. Appl. No. 14/033,130 dated Aug. 9, 2018.
Official Communication for U.S. Appl. No. 14/180,308 dated Aug. 6, 2018.
Official Communication for U.S. Appl. No. 15/858,945 dated Sep. 10, 2018.
Official Communication for U.S. Appl. No. 13/837,815 dated Apr. 5, 2018.
Official Communication for U.S. Appl. No. 14/867,552 dated May 31, 2018.
Official Communication for U.S. Appl. No. 14/869,721 dated May 11, 2018.
Official Communication for U.S. Appl. No. 15/351,313 dated Jun. 4, 2018.
Official Communication for U.S. Appl. No. 15/858,945 dated Apr. 4, 2018.
Official Communication for U.S. Appl. No. 15/859,058 dated May 14, 2018.
Official Communication for U.S. Appl. No. 14/869,721 dated Oct. 11, 2018, pp. 1-73.
Official Communication for U.S. Appl. No. 14/867,552 dated Nov. 21, 2018, pp. 1-37.
Official Communication for U.S. Appl. No. 15/260,221 dated Oct. 5, 2018, pp. 1-40.
Official Communication for U.S. Appl. No. 15/379,267 dated Oct. 18, 2018, pp. 1-9.
Official Communication for U.S. Appl. No. 15/859,058 dated Dec. 5, 2018, pp. 1-20.
Official Communication for U.S. Appl. No. 14/033,130 dated Dec. 18, 2018, pp. 1-11.
Official Communication for U.S. Appl. No. 15/271,013 dated Dec. 18, 2018, pp. 1-47.
Official Communication for U.S. Appl. No. 14/846,349 dated Oct. 18, 2019.
Official Communication for U.S. Appl. No. 14/981,747 dated Oct. 24, 2019.
Official Communication for U.S. Appl. No. 115/271,013 dated Nov. 21, 2019.
Official Communication for U.S. Appl. No. 15/859,008 dated Oct. 24, 2019.
Official Communication for U.S. Appl. No. 14/180,308 dated Dec. 10, 2019.
Official Communication for U.S. Appl. No. 14/646,349 dated Oct. 18, 2019, pp. 1-52.
Official Communication for U.S. Appl. No. 14/981,747 dated Oct. 24, 2019, pp. 1-62.
Official Communication for U.S. Appl. No. 15/271,013 dated Nov. 21, 2019, pp. 1-108.
Official Communication for U.S. Appl. No. 15/859,008 dated Oct. 24, 2019, pp. 1-22.
Daytime vs Night display on Garrnin GPS, POI Factory, Jun. 2008, http://www.poi-factory.com/node/14562 (Year: 2008), pp. 1-3.
Official Communication for U.S. Appl. No. 14/180,308 dated Dec. 10, 2019, pp. 1-29.
Official Communication for U.S. Appl. No. 14/981,747 dated Aug. 1, 2019.
Official Communication for U.S. Appl. No. 15/260,221 dated Sep. 3, 2019.
Official Communication for U.S. Appl. No. 15/351,313 dated Aug. 28, 2019.
Official Communication for U.S. Appl. No. 13/935,147 dated Mar. 28, 2019, pp. 1-80.
Official Communication for U.S. Appl. No. 14/033,130 dated Apr. 10, 2019, pp. 1-80.
Official Communication for U.S. Appl. No. 14/180,308 dated Feb. 26, 2019, pp. 1-26.
Official Communication for U.S. Appl. No. 14/846,349 dated Apr. 11, 2019, pp. 1-57.
Official Communication for U.S. Appl. No. 14/867,552 dated Feb. 11, 2019, pp. 1-76.
Official Communication for U.S. Appl. No. 14/981,747 dated Dec. 26, 2018, pp. 1-63.
Official Communication for U.S. Appl. No. 15/260,221 dated Jan. 8, 2019, pp. 1-27.
Official Communication for U.S. Appl. No. 15/271,013 dated Mar. 28, 2019, pp. 1-109.
Official Communication for U.S. Appl. No. 15/351,313 dated Apr. 1, 2019, pp. 1-38.
Official Communication for U.S. Appl. No. 15/858,945 dated Feb. 26, 2019, pp. 1-13.
Official Communication for U.S. Appl. No. 15/859,058 dated Mar. 25, 2019, pp. 1-57.
Official Communication for U.S. Appl. No. 15/859,008 dated Apr. 12, 2019, pp. 1-24.

(56) References Cited

OTHER PUBLICATIONS

Official Communication for U.S. Appl. No. 14/869,721 dated Jun. 20, 2019, pp. 1-346.
Official Communication for U.S. Appl. No. 14/180,308 dated Jun. 11, 2019, pp. 1-26.
Official Communication for U.S. Appl. No. 15/260,221 dated Jul. 11, 2019, pp. 1-40.
Official Communication for U.S. Appl. No. 15/351,313 dated Jun. 14, 2019, pp. 1-9.
Official Communication for U.S. Appl. No. 14/981,747 dated May 8, 2019, pp. 1-77.
Official Communication for U.S. Appl. No. 15/271,013 dated Jun. 14, 2019, pp. 1-8.
Official Communication for U.S. Appl. No. 14/981,747 dated Aug. 1, 2019, pp. 1-5.
Official Communication for U.S. Appl. No. 15/260,221 dated Sep. 3, 2019, pp. 1-27.
Official Communication for U.S. Appl. No. 15/351,313 dated Aug. 28, 2019, pp. 1-47.
Selen, et al. "Model-Order Selection: A review of information criterion rules," IEEE Signal Processing Magazine, Jul. 2004, pp. 38-47.
Official Communication for U.S. Appl. No. 14/846,349 dated Jan. 21, 2020, pp. 1-6.
Official Communication for U.S. Appl. No. 15/859,008 dated Feb. 26, 2020, pp. 1-8.
Official Communication for U.S. Appl. No. 14/180,308 dated Mar. 9, 2020, pp. 1-6.
Official Communication for U.S. Appl. No. 14/846,349 dated Jan. 21, 2020.
Official Communication for U.S. Appl. No. 15/859,008 dated Feb. 26, 2020.
Official Communication for U.S. Appl. No. 14/180,308 dated Mar. 9, 2020.
Beraldi, et al., "A Clustering Approach for Scenario Tree Reduction: an Application to a Stochastic Programming Protfolio Optimization Problem," TOP, vol. 22, No. 3, 2014, pp. 934-949.
Official Communication for U.S. Appl. No. 15/271,013 dated Mar. 23, 2020, pp. 1-45.
Official Communication for U.S. Appl. No. 14/981,747 dated Apr. 23, 2020, pp. 1-14.
Office Communication for U.S. Appl. No. 14/180,308 dated May 11, 2020, pp. 1-18.
Office Communication for U.S. Appl. No. 15/659,008 dated May 28, 2020, pp. 1-20.
Office Communication for U.S. Appl. No. 14/846,349 dated Jun. 8, 2020, pp. 1-32.
Office Communication for U.S. Appl. No. 15/271,013 dated Jun. 15, 2020, pp. 1-6.
Examination Report for UK Patent Application No. GB1617238.9 dated Sep. 24, 2020, pp. 1-7.
Office Communication for U.S. Appl. No. 15/859,008 dated Oct. 9, 2020, pp. 1-22.
Office Communication for U.S. Appl. No. 14/180,308 dated Oct. 13, 2020, pp. 1-17.
Office Communication for U.S. Appl. No. 15/859,008 dated May 28, 2020, pp. 1-20.

* cited by examiner

Reserved Instances

Strategy

1 What timeframe can you commit to?

ALL AT ONCE    1 YEAR    3 YEAR

A Purchasing Timeframe determines the time period over which you'll make your purchases. You can buy the reserved instances we recommend all at once, or we can recommend what to buy over the course of a year, or several years.

was this helpful?

2 How much can you afford upfront?

LOW COSTS    MEDIUM    HIGH COSTS

Upfront Costs are how much money you're prepared to spend immediately. Currently, cloud providers will provide better discounts if you're willing to spend more initially. But if you can't invest right away, we can still make recommendations for you.

was this helpful?

3 Tweak your recommendation

1    [5]    15 RECOMMENDED

We'll give you a specific Number of Recommended RIs based on you Purchasing Strategy and Upfront Costs - but you may choose to (or need to) purchase fewer RIs. This slider lets you see estimated savings, even if they aren't completely optimized.

was this helpful?    hide help

Monthly Cost Forecast — Your estimated savings over the next year — 503

510 — RESERVED INSTANCE EXPIRATION
514 — WITH NO ACTION TAKEN — $115K — This is your estimated monthly cost if you don't take action.

$30K ESTIMATED MONTHLY SAVINGS 512, 516 — WITH RECOMMENDATIONS TAKEN — $85K — This is your estimated monthly cost if you follow our recommendations.

520 — FIRST MONTH PURCHASE

No reserved instances

Recommended number of instances

MAY 2012 | JUN | JUL | AUG | SEP | OCT | NOV | DEC | JAN | FEB | MAR | APR | MAY 2013

*FIG. 5* — 500

Purchase List For July 2012

| QTY | PRICE | LOCATION | SIZE | OS |
|---|---|---|---|---|
| 4 | $135.99 | us-east-1a | m1.large | Windows |
| 2 | $35.99 | us-east-1b | m1.small | Linux |
| 1 | $725.99 | us-west-1b | m1.meduium | Linux |
| 1 | $725.99 | us-west-1b | m1.medium | Linux |

Show more (11)

602 — To stay on track with your forecast, you'll need to make the following purchases in July 2012

Actions For Today

604 — Some of your reserved resources are going unused. Consider switching your existing resource configurations to match your unused RIs.

| LOCATION | SIZE | OS | EXPIRATION DATE |
|---|---|---|---|
| us-east-1a | m1.large | Windows | August 5th, 2013 |
| us-east-1b | m1.small | Linux | November 5th, 2013 |

DYNAMIC RECOMMENDATIONS TAKEN OVER TIME FOR RESERVATIONS OF INFORMATION TECHNOLOGY RESOURCES

CROSS-REFERENCE TO RELATED APPLICATIONS

The present application is a Continuation of U.S. application Ser. No. 13/675,837 filed Nov. 13, 2012, entitled "DYNAMIC RECOMMENDATIONS TAKEN OVER TIME FOR RESERVATIONS OF INFORMATION TECHNOLOGY RESOURCES," the benefit of the earlier filing date of which is hereby claimed under 35 U.S.C. § 120 and 37 C.F.R. § 1.78, and which is further incorporated by reference.

TECHNICAL FIELD

The present invention relates generally to computer automated activity based budgeting and forecasting, and more particularly, but not exclusively to providing an interactive mechanism for managing reservations of Information Technology (IT) resources, such as cloud based IT resources.

BACKGROUND

Cloud-based computing may be defined as the use of computing resources (hardware and software) that are delivered as a service over a network, such as the Internet. Cloud-based computing is often argued to provide numerous benefits to a business, including rapid scalability, availability, and cost savings. Some providers of cloud-based computing services allow users to buy access to their resources from the cloud on a pay-per-use basis; other providers further provide an ability of a user to pay to reserve resources for an extended period of time. Other providers provide still different plans for use of their services that might include variable rate plans, reservations based on differing costing models over different time periods.

While cloud-based services may provide cost savings, it remains up to the user purchasing the services to determine when and how to make use of the services, so that cost benefits may be obtained. However, there appears to be little solutions designed to help IT managers, and/or other users of cloud-based services, to manage or communicate costs of their IT resource consumption. IT managers, and other users, are often required to predict with little assistance as to when to purchase a cloud-based service, or even how much to purchase. This lack of adequate tools for the IT manager even extends to a lack of tools usable to assess when to purchase IT resources for in-house versus when to use cloud-based services. With an ever increasing number of cloud service providers becoming available, and an ever growing number of different purchase plans being made available, making such IT evaluations is becoming more and more complex. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description, which is to be read in association with the accompanying drawings, wherein:

FIGS. 5-6 illustrate non-limiting, non-exhaustive examples of interfaces for managing and displaying IT resource reservations.

DESCRIPTION OF THE VARIOUS EMBODIMENTS

Figure 1:
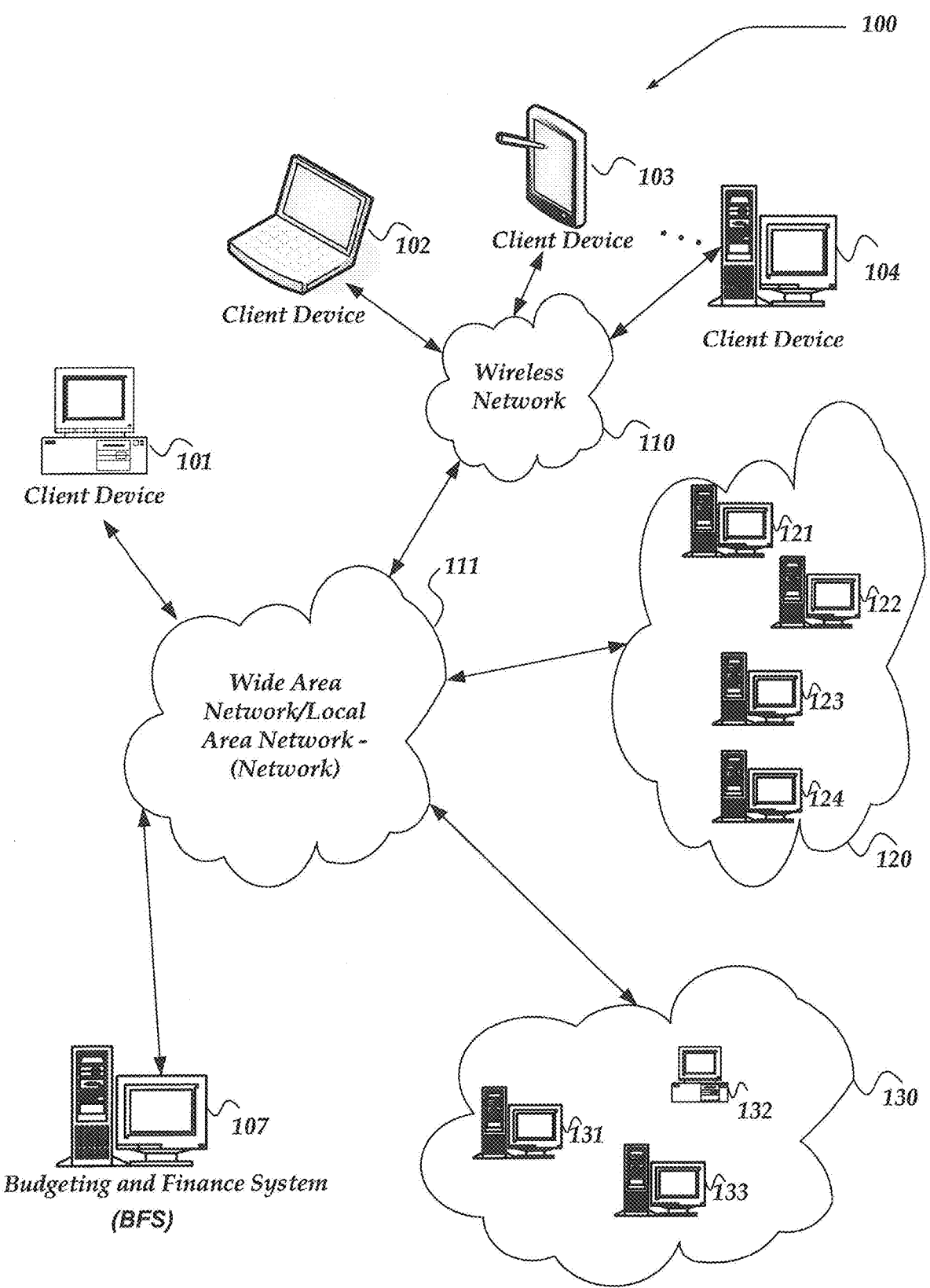
FIG. 1 is a system diagram showing components of an environment in which at least one of the various embodiments may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "instance" refers to a configuration of a computing resource, including hardware and software. In one embodiment, an instance is further defined based on a geographic location in which the computing device physically resides. Thus, for example, an instance might be defined based on its hardware, the software made available for use, and where the computing device resides. In some embodiments, an instance is further definable based on a network connection to the hardware device. Moreover, the term "resource" may be used interchangeably with the term "instance," where a resource is a definable configuration of a computing device, including its hardware, software, and physical location.

Typically, where a resource resides within a cloud-computing environment, the resource may be leased, or otherwise purchased, for various time periods. For example, the resource may be purchased for use at once, and purchased based on a pay per use plan. In other cases, a resource might be leased by reserving use of the resource for some time period, such as six months, one year, two years, three years, or the like. Further, resources may be purchased based on a combination of fixed fees, and variable fees. The fixed fees may be based on the lease/purchase time, while the variable fees may be based on actual usage of the resource. For example, a user might purchase for three years, and use the resource on an average over the three years at 60% of the time. Thus, an effective fee rate may be determined that varies over some time period based on a combination of the fixed fees and the variable usage rate fees.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the subject innovations are directed towards providing dynamic recommendations for reserving information technology resources over time that may be visually displayed over that time frame. In one embodiment, the recommendations may be determined based on an analysis of actual usage data obtained over a prior time period that is then used to predict future resource demands. The subject innovations enable a user to perform various 'what-if' analysis to determine optimum purchase times, and configurations. In some embodiments, the user is further provided information about currently purchased resource under-utilizations to enable the user to redistribute work, release resources, or take other actions directed towards improving management of their IT budget. While subject innovations may be directed towards managing IT resources obtained through one or more cloud computing service providers, some embodiments further allow the user to perform make/buy decisions such as when to use in-house resources versus using cloud-based resources, or to use on-demand resources versus using reserved resources.

In some embodiments, the recommendation analysis may assume that a future usage of resources will be substantially the same as a previous time period usage. Substantially the same might be based on using some statistical parameter describing the historical usage, including a mean, mode, median value, or the like. However, other more complex algorithms may be employed, including usage of a machine learning model, linear prediction models, non-linear prediction models, a covariance estimation approach, a time-varying estimation model, or any of a variety of other models. For example, in some embodiments, a model that accounts for trends or varying use of resources might be employed. Moreover, the analysis may be configured to account for various service level agreement cost implications, as well as various purchase/lease options provided by a given resource provider. In fact, virtually any parameter that might affect a cost of the resource to the user may be used to provide to the user a visual cost recommendation over time. In some embodiments, a user might select a particular time period, such as a current date, and be provided with a table reflecting a recommended purchase list based on an optimum costing forecast model. In other embodiments, a table might be displayed indicating resources that have been reserved, but are currently going unused. In some embodiments, a recommendation of how to reallocate the unused resources may be provided.

Illustrative Operating Environment

FIG. 1 shows components of one embodiment of an environment in which at least one of the various embodiments may be practiced. Not all the components may be required to practice various embodiments, and variations in the arrangement and type of the components may be made. As shown, system 100 of FIG. 1 includes local area networks ("LANs")/wide area networks ("WANs")-(network) 111, wireless network 110, client devices 101-104, Budgeting and Finance System (BFS) 107, and cloud services 120 and 130. Within cloud service 120 are illustrated instances (or resources) 121-124; while within cloud service 130 are illustrated instances (or resources) 121-133.

Generally, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client devices 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client devices 102-104 may operate over wired and/or wireless network. Today, many of these devices include a capability to access and/or otherwise communicate over a network such as network 111 and/or even wireless network 110. Moreover, client devices 102-104 may access various computing applications, including a browser, or other web-based application.

In one embodiment, one or more of client devices 101-104 may be configured to operate within a business or other entity to perform a variety of services for the business or other entity. For example, client devices 101-104 may be configured to operate as a web server, an accounting server, a production server, an inventory server, or the like. However, client devices 101-104 are not constrained to these services and may also be employed, for example, as an end-user computing node, in other embodiments. Further, it should be recognized that more or less client devices may be included within a system such as described herein, and embodiments are therefore not constrained by the number or type of client devices employed. In any event, one or more of client devices 101-104 may be considered as in-house resources, or more generally on-demand resource. As used herein, the term "on-demand resource," refers to resources in which a user may pay for compute capacity by the hour, or some other time period, with no long-term commitments. Further, as used herein, the term "reserved resource," refers to resources in which the user is provided the option to make an initial payment for each resource to be reserved for use in some future time period.

In another embodiment, one or more of client devices 101-104 may be configured to access various services from one or more of the resources within various cloud-based services, such as cloud services 120 and/or 130.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ any of a variety of scripting languages, including for example, JavaScript, as well as any of a variety of markup languages, including for example Standard Generalized Markup Language (SGML), HyperText Markup Language (HTML), eXtensible Markup Language (XML), HTML5, or the like, to display and send a message. In one embodiment, a user of the client device may employ the browser application to perform various actions over a network.

Client devices 101-104 also may include at least one other client application that is configured to receive and/or send data, including resource recommendation information, between another computing device. The client application may include a capability to provide requests and/or receive data relating to resource recommendations. In other embodiments, BFS 107 may be configured to provide to the client devices 101-104 visual representations of resource recommendations usable to enable a user to make IT decisions for allocating budget to IT resources and for reserving use of one or more resources, such as cloud-based resources.

Wireless network 110 is configured to couple client devices 102-104 and its components with network 111. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client devices 102-104 and another computing device, network, or the like.

Network 111 is configured to couple network devices with other computing devices, including, BFS 107, client device(s) 101, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 2:
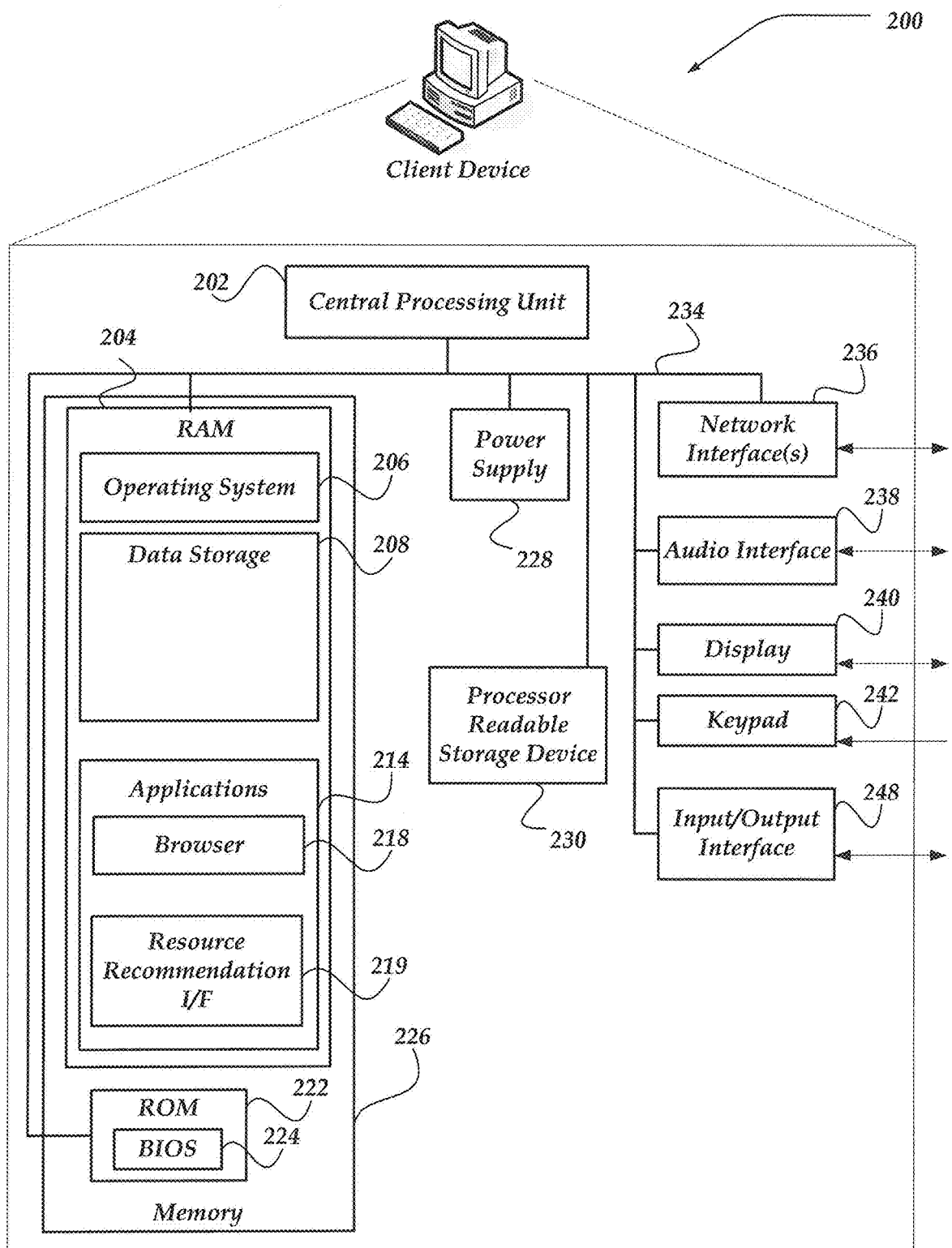
FIG. 2 shows one embodiment of a client device that may be included in a system in accordance with the embodiments.

BFS 107 may include virtually any network device usable to provide resource recommendation services, such as network device 200 of FIG. 2. In one embodiment, BFS 107 employs various techniques to create and display resource recommendations. BFS 107 may include applications for generating cost traces, and predications within a resource recommendation model. Furthermore, BFS 107 may include applications for visualizing the generated costs and recommendations. BFS 107 may also enable the user to perform various what-if analysis and dynamically view differing resource recommendations based in part on user input parameters, and historical usage data.

Devices that may operate as BFS 107 include various network devices, including, but not limited to personal computers, desktop computers, multiprocessor systems, microprocessor-based or programmable consumer electronics, network PCs, server devices, network appliances, or the like. It should be noted that while BFS 107 is illustrated as a single network device, the invention is not so limited. Thus, in another embodiment, BFS 107 may represent a plurality of network devices. For example, in one embodiment, BFS 107 may be distributed over a plurality of network devices and/or implemented using a cloud architecture.

Moreover, BFS 107 is not limited to a particular configuration. Thus, BFS 107 may operate using a master/slave approach over a plurality of network devices, within a cluster, a peer-to-peer architecture, and/or any of a variety of other architectures. Thus, BFS 107 is not to be construed as being limited to a single environment, and other configurations, and architectures are also envisaged. BFS 107 may employ processes such as described below in conjunction with FIGS. 4-22 to perform at least some of its actions.

Cloud services 120 and 130 represent cloud-based service providers that provider for use by a user various instances or resources. While cloud services 120 is illustrated to include resources 121-124, and cloud services 130 is illustrated to include resources 131-133, other implementations are not so constrained. Thus, it should be understood that cloud services 120 and 130 may include many more or less resources than illustrated in FIG. 1. Further resources 121-124 and 131-133 are intended to be representative and not actual reflections of configurations. Thus, a cloud service might include resources that are configured into clusters, are rack components, a virtual machine, a plurality of different computing devices, reside in differing geographic locations around the United States, or other locations, or the like. As noted above, each resource or instance may be defined based on its hardware, software, and physical location. However, other parameters may also be used, including its service level agreement, lease/purchase rate plans, or the like. In some embodiments, a resource might be purchased at once, and billed to the user based on usage plus the purchase fees, while others might be reserved for a period of time, such as one or three years, and billed out based on an effective fee rate that in turn is based on a usage rate and a fixed fee rate schedule.

In one embodiment, cloud services 120 and 130 might be considered to be managed by different service providers; however, in other embodiments, cloud services 120 and 130 might represent services provided over different locations, different arrangements of services, or the like. For example, in one embodiment cloud services might be partitioned based on different service level agreements, different locations, different types of architectures, different security levels, and/or any of a variety of other criteria.

In any event, cloud services 120 and 130, may be configured to provide information about actual usage of resources, as well as various information about the resource, including its configuration and fee rate plans, or the like, to BFS 107, which may then employ the information in part to determine a resource recommendation. In some embodiments, configurations of client devices or other in-house resources, their costs schedules, and the like, might also be sent to BFS 107, so that BFS 107 might consider in-house (or more generally, on-demand) resources as well as outsourced (or more generally, reserved) resource usages (e.g., cloud services) in determining resource recommendations. It should be noted that while FIG. 1 illustrates cloud services, other forms of outsourced services may also be considered, and thus, subject innovations are not constrained to merely considering cloud services.

Moreover, BFS 107 might employ a process such as described below in conjunction with FIG. 4 to perform and provide resource recommendations. Further, BFS 107 might provide graphical interfaces such as described below in conjunction with FIGS. 5-6 for use in managing a set of recommendations for reserving resources, highlighting underused reserved resources, and even providing recommendations for reallocating resources.

Illustrative Client Device

FIG. 2 shows one embodiment of client device 200 that may be included in a system implementing at least one of the various embodiments. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1. It should be recognized that, as discussed above, client devices may operate as an interface mechanism into a cloud-based service, and/or as a resource that may be managed along with the resources obtained through the cloud-based service.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG.

2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device (not shown) within client device 200. Data storage 208 may also store various financial data, including reservation data, usage data, and the like, that may reside within a database, text, spreadsheet, folder, file, or the like. Such financial data may also be stored within any of a variety of other computer-readable storage devices, including, but not limited to a hard drive, a portable storage device, or the like, such as illustrated by non-transitory computer-readable storage device 230.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VoIP") applications, contact managers, task managers, transcoders, database programs, word processing programs, security applications, spreadsheet programs, games, search programs, and so forth. Applications 214 may include, for example, browser 218 and resource recommendation interface (I/F) 219.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as BFS 107 of FIG. 1. In one embodiment, browser 218 may enable a user to view and/or manipulate resource data, including creating resource recommendations, adding/purchasing/reallocating resources, modifying resource reservation models, rendering visualizations of resource recommendations and related what-ifs, or the like.

In at least one of the various embodiments, a user may employ client device 200 to create and manage IT resource recommendations and to access information stored or otherwise managed through BFS 107. In at least one of the various embodiments, a user may enter various types of data into a resource recommendation system accessible through BFS 107. Also, in at least one of the various embodiments, the user may be enabled to perform a variety of actions on the data, including, queries, comparisons, summations, analysis, or the like. In some embodiments, a user may employ client 200 to create one more resource reservation models.

Resource recommendation I/F (RRI) 219 provides another mechanism for interacting with BFS 107. RRI 219 may operate as a separate application providing and managing communications with BFS 107 over a network and providing for display of user interfaces, including, but not limited to those described below. Thus, in some embodiments, the user might employ browser 218 or RRI 219 to communicate with BFS 107, provide data to BFS 107, and otherwise manage IT resource reservations. It should be noted that while the subject innovations are directed towards managing It resource reservations, other actions might also be performed, including, managing other aspects of IT resources, including budgeting, tracking work flow, up/down times of resources, application usages, back-up management, recovery management, and any of a variety of other IT management activities.

Illustrative Network Device

Figure 3:
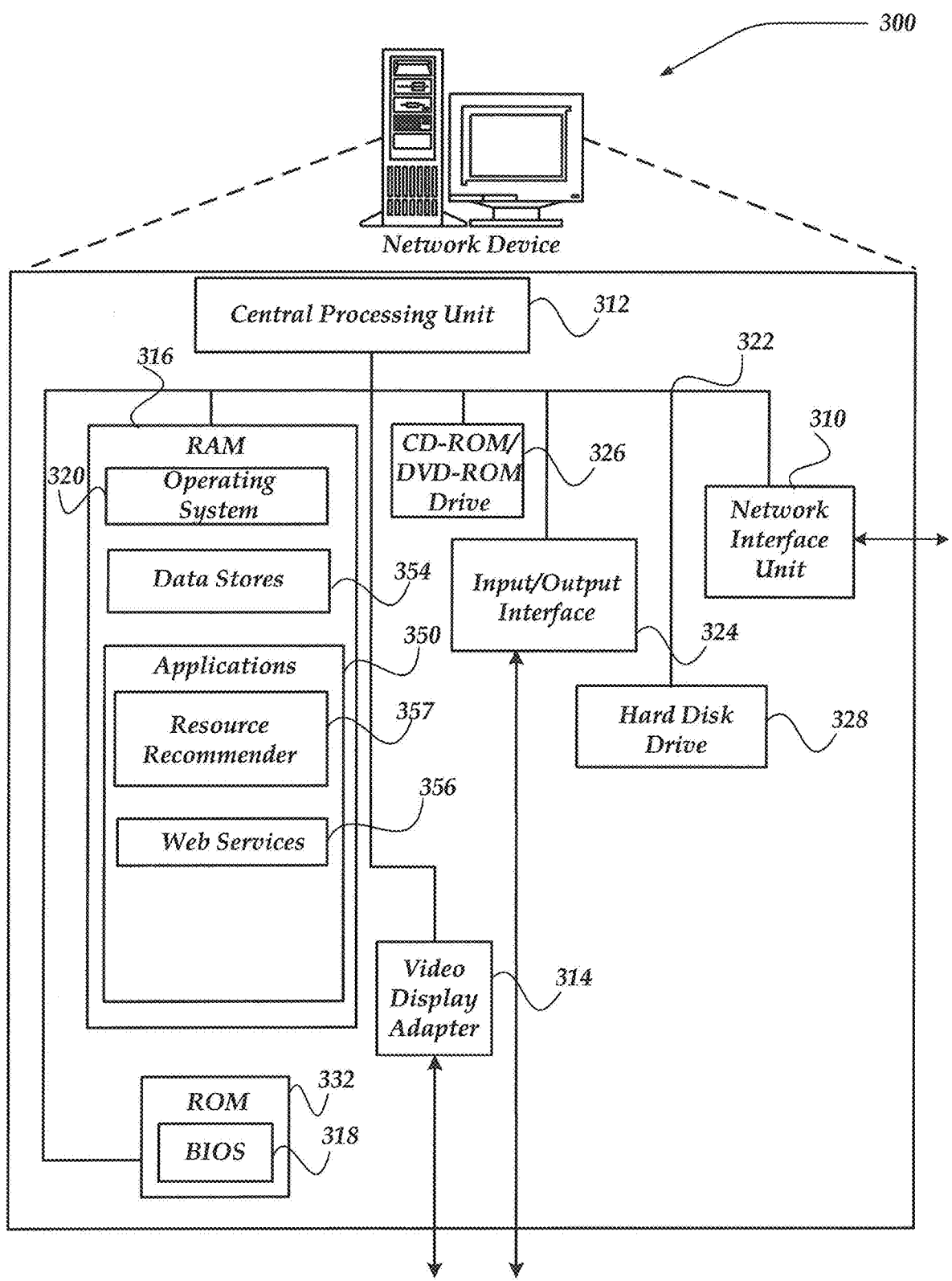
FIG. 3 shows one embodiment of a network device that may be included in a system implementing at least one of the various embodiments.

FIG. 3 shows one embodiment of network device 300 that may be included in a system implementing at least one of the various embodiments. Network device 300 may include many more or less components than those shown. The components shown, however, are sufficient to disclose an illustrative embodiment for practicing the invention. Network device 300 may represent, for example, BFS 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of processor-readable storage media. Processor-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD), Blu-Ray, or other optical storage, magnetic cassettes, magnetic tape, magnetic disk storage or other magnetic storage devices, or any other physical medium which can be used to store the desired information and which can be accessed by any computing device.

As shown, data stores 354 may include a database, text, spreadsheet, folder, file, or the like, that may be configured to maintain and store various resource recommendation models, resource data, resource usage logs, resource configuration data, service level agreements, cloud-service provider contract data, or the like. Data stores 354 may further include program code, data, algorithms, or the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include web services 356, and resource recommender 357.

Web services 356 represent any of a variety of services that are configured to provide content, over a network to another computing device. Thus, web services 356 include for example, a web server, a File Transfer Protocol (FTP) server, a database server, a content server, or the like. Web services 356 may provide the content over the network using any of a variety of formats, including, but not limited to WAP, HDML, WML, SGML, HTML, XML, compact HTML (cHTML), extensible (xHTML), or the like.

In one embodiment, web services 356 may provide an interface for accessing and manipulating data in a data store, such as data stores 354, or the like. In another embodiment, web services 356 may provide for interacting with resource recommender 357 that may enable a user to access and/or otherwise manage resource reservations, and/or other IT management related actions.

In at least one of the various embodiments, resource recommender 357 may enable users to generate financial resource recommendation models, establish what-if scenarios, display graphic plots for reserving resources, determine underused, including unused, resources, or the like. Resource recommender 357 may be configured in one embodiment, to employ a process such as described below in conjunction with FIG. 4 to perform at least some of its actions. Further resource recommender 357 may provide various user interfaces including those discussed below in conjunction with FIGS. 5-6.

Generalized Operation

The operation of certain aspects of the invention will now be described with respect to FIGS. 4-6. The operations of the processes described below may, in one embodiment, be performed within BFS 107 of FIG. 1, and/or displayed at one or more screens within one or more client devices 101-104 of FIG. 1.

Figure 4:
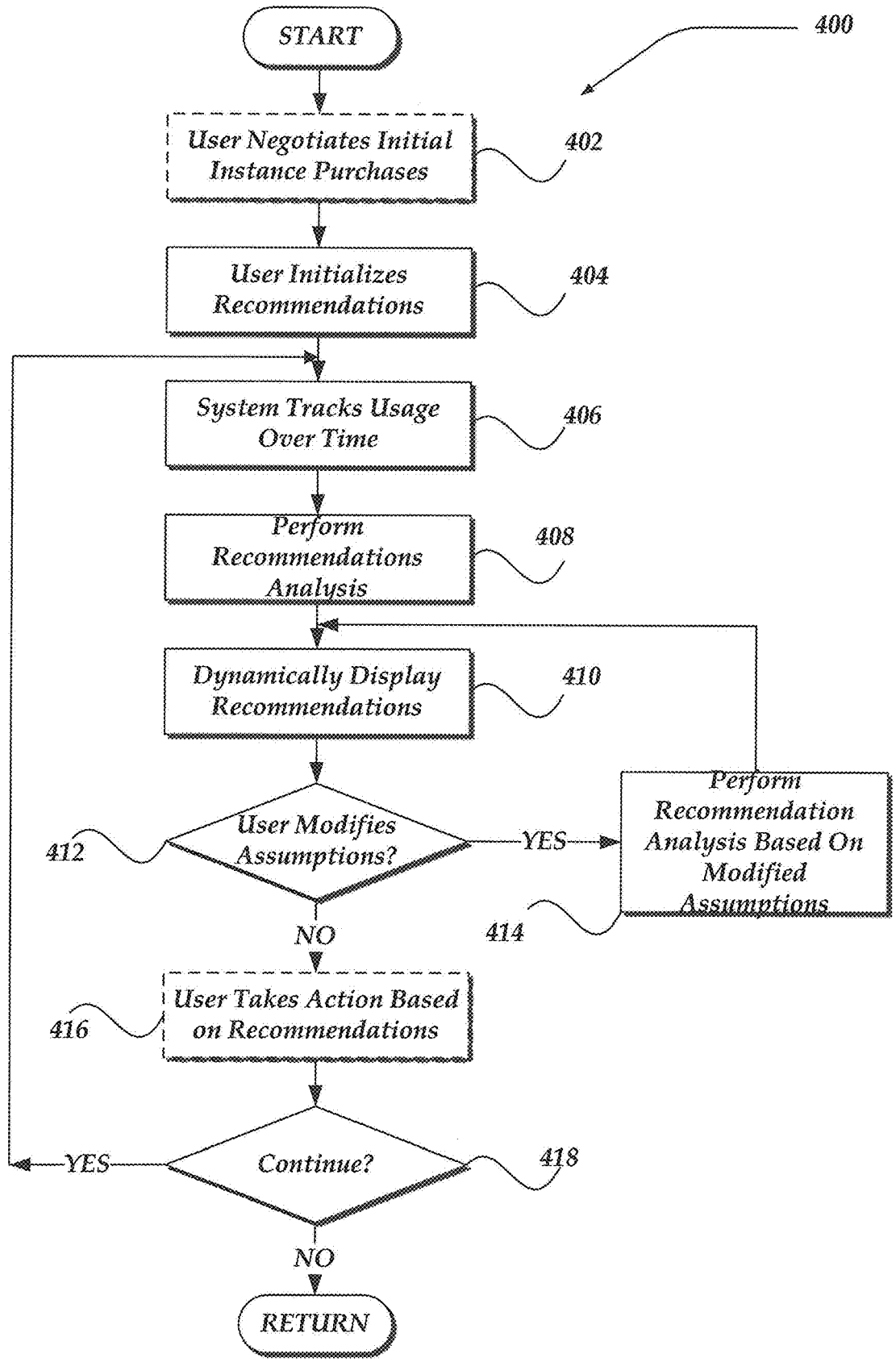
FIG. 4 illustrates a logical flow diagram showing one embodiment of a process usable to manage and display recommendations for reserving IT resources, such as cloud IT resources.

FIG. 4 illustrates a logical flow diagram showing one embodiment of a process 400 usable to manage and display recommendations for reserving IT resources, such as cloud IT resources, in-house resources, on-demand resources, reserved resourced, and the like.

In one embodiment, a user may select to initially arrange for usage of various IT resources directly through one or more cloud service providers. During this initial stage, the user might contract for initial use of various resources, reserve the resources based on various terms of use, including agreements over a six month, one year, two year, three year, or other time period. Moreover, it should be understood, that the user may select to manage IT resources from a plurality of different cloud service providers, manage in-house (or on-demand) resources, and/or manage IT resources obtained from other than cloud service providers and/or other reservation type service providers.

While such actions may be performed prior to beginning process 400, in other embodiments, initial contracting for services might be performed within process 400, such as at step 402. Thus, process 400 begins, after a start block, at block 402, where the user may negotiate initial IT resource (instance) purchases, reservations, contracts, and the like. In one embodiment, block 402 might be performed using interfaces provided by BFS 107; however, as noted above, block 402 might be performed independent of use of BFS 107, as suggested by dashed block 402.

In any event, proceeding to block 404, the user may establish an account for reservation management services through BFS 107, and provide information about resources (instances) to be managed, including, cloud services, in-house services, and the like. In one embodiment, resource information might be input automatically through a request by BFS 107 to a cloud service provider, on behalf of the user. In other embodiments, an interface might be established with a user's computing device to enable access to various data about the resources. In still another embodiment, the user might directly input data about resources to be tracked and managed by BFS 107.

Initially, the user may be provided with an interface illustrating a list of resources that are to be managed by BFS 107, where the list might provide an ability for the user to view details about a configuration of the resource, a location of the resource, a service level agreement for the resource, uptime/downtime information about the resource, and a variety of other information about the resource.

Proceeding to block 406, resources identified within BFS 107 are then tracked for usage by the user and/or the user's business. In one embodiment, the usage data might be directly sent by the in-house (or on-demand), cloud services (or reservation services), or the like, using any of a variety of mechanisms. For example, an agreement might be established that the tracked resources automatically provide usage data to BFS 107 based on regular schedules, based on queries by BFS 107, and/or a combination of events, conditions, or the like. Such usage data may include any changes in a configuration of a resource, as well as loads on the resource, up/down times of the resources, a cost of the resource, and any of a variety of other related information.

At least some of the tracked data may be used to make predictions on future usage of a resource, determine when to move an in-house resource usage to a cloud resource (or the reverse), determine when to purchase additional resources, release a resource, re-allocate a resource usage, or the like. In some embodiments, tracked data for a defined prior period of time may be used to make recommendations. For example, a three month prior period of time might be used to determine recommendations. However, in other embodiments, tracked data may be used based on various models, including, error covariance models, learning models, or the like, where historical data may be consolidated into various parameters of the model over virtually any time period.

At any time that the user wishes to perform recommendations analysis, process 400 moves to block 408. This may occur, for example, when the user selects an interface into resource recommender 357 of network device 300 of FIG. 3.

Processing then flows to block 410, where recommendations are dynamically displayed to the user. One such non-limiting, non-exhaustive interface is discussed in more detail below in conjunction with FIG. 5. Briefly, however, the user may be provided with various strategy interfaces.

At decision block 412, the user might select to modify various user input parameters or assumptions useable to determine resource recommendations. For example, the user might be able to vary a time frame in which the resources are to be committed to by the user, vary an upfront cost parameter, and/or vary a number of recommended resources to be reserved, or the like. The user may further update various resources to be considered, their configurations, contracts, or the like.

If the user selects to modify any assumptions, input parameters, or the like, processing flows to block 414, where, based on the tracked data, and the user input assumptions, the changes may be used to perform an updated analysis. Then, flowing to block 410, the results are dynamically displayed to the user to indicate changes in the recommendations for reserving resources. As the user varies input parameters, the user may automatically and dynamically view how the changes affect the resulting recommendations (by cycling through blocks 410, 412, and 414). Thus, at least in part, the user may dynamically perform a variety of 'what-if' analysis to determine an optimum resource recommendation given the constraints provided by the user, the resource providers, and/or the tracked data.

When the user selects to accept the recommendations (at decision block 412, by no longer modifying inputs) processing flows to block 416. At block 416, the user may take one or more actions based on the recommendations. In one embodiment, this might include selecting a time period within the forecast display of FIG. 5. This action may then result in a display of actions to be taken. One non-limiting, non-exhaustive embodiment of such a display is described in more detail below in conjunction with FIG. 6. The user may then make purchases, release resources, renegotiate contracts for resources, reallocate resource usages, or the like. In one embodiment, such actions might be performed outside of process 400 (as indicated by the dashed block 416), or be performed through another interface provided by BFS 107.

Processing continues to decision block 418, where a determination is made whether to continue to manage tracking and recommending resource reservations, or to terminate the process. If the process is to continue, then the flow may return to block 406. However, in other embodiments, the flow might return to block 404, where additional changes to the resources might be performed by the user, including adding new resources, deleting one or more resources, or the like. Should it be determined that process 400 is to terminate, then flow may return to a calling process to perform other actions.

It will be understood that each component of the illustrations, and combinations of components in these illustrations, can be implemented by computer program instructions. These program instructions may be provided to a processor to produce a machine, such that the instructions, which execute on the processor, create means for implementing the actions specified in the flow component or components. The computer program instructions may be executed by a processor to cause a series of operational steps to be performed by the processor to produce a computer-implemented process such that the instructions, which execute on the processor to provide steps for implementing the actions specified in the flow component or components. The computer program instructions may also cause at least some of the operational steps shown in the components of the flows to be performed in parallel. Moreover, some of the steps may also be performed across more than one processor, such as might arise in a multiprocessor computer system. In addition, one or more components or combinations of components in the flow illustrations may also be performed concurrently with other components or combinations of components, or even in a different sequence than illustrated.

Accordingly, components of the flow illustrations support combinations of means for performing the specified actions, combinations of steps for performing the specified actions and program instruction means for performing the specified actions. It will also be understood that each component of the flow illustrations, and combinations of components in the flow illustrations, can be implemented by special purpose hardware based systems, which perform the specified actions or steps, or combinations of special purpose hardware and computer instructions.

Non-Limiting, Non-Exhaustive Example User Interfaces

The following provides examples of user interfaces usable in conjunction with process 400 of FIG. 4 to enable a user to manage resource recommendations. It should be noted that other interfaces may also be provided. Moreover, it should be noted that the interfaces illustrated in FIGS. 5-6 discussed below may include more or less components that shown. In addition, not all the components may be required to practice various embodiments, and variations in the arrangement and type of the components may be made.

As shown, however, FIGS. 5-6 illustrate non-limiting, non-exhaustive examples of interfaces for managing and displaying IT resource reservations. As shown in FIG. 5, for example, is a display 500 that provides one portion 502 usable for the user to modify various assumptions, and/or parameters used to determine resource reservations.

For example, the user might be able to modify what time frame for which the user might wish to commit to for reserving resources, as shown in portion 502, labeled 1. The displayed time frame might be specific to a given cloud service provider. Thus, while illustrated in FIG. 5 to provide up to three years, other time frames might be provided instead. Briefly, this time frame allows the user to determine the time period over which they wish to make purchases, allowing the user to select immediate purchases, all at once, or to make purchases over the course of the contract. Also illustrated, labeled 2, the user might provide an input indicating how much the user wishes to pay upfront, or at a beginning of a contract period. In one embodiment, the user might be able to input a specific value, or a generic parameter, such as low/medium/high, or the like. Input, labeled 3 in FIG. 5, allows the user to modify resource recommendations from an initial computed recommendation, to some value less than the recommended amount of resources. As illustrated, the recommended value is 15 resources, for which the user might select the recommended value or some value less.

As shown in the lower portion 503, of display 500 provides an immediate and dynamically changing resource recommendation chart over time. Portion 503 may dynamically change based on changes in inputs, assumptions, or the like, by the user. Thus, should the user change any of the input assumptions in portion 502, they may immediately (or as quickly as reasonable given network connections, or the like) view the impact to the recommendations.

As shown in portion 503, are lines 510, 512, 514, and 516. Line 510 is directed towards illustrating over time a costing forecast based on no reserved instances. Line 512 is directed towards illustrating over time a costing forecast that is based on the recommended number of instances. Line 514 illustrates a costing flow over time should the user select to take no actions, including purchases, re-allocations, or the like, while line 516 illustrates costing flow over time should the user follow the recommendations for reserving and/or otherwise managing resources provided by process 400 of FIG. 4. As illustrated in the lower portion 502, the user may quickly see a cost difference between the actions the user may take or not take. By varying assumptions, and/or other inputs, including taking none, some, or all of the recommendations, the lower portion 503 can dynamically update and reflect changes to the recommendations.

As discussed above, the recommendations are in part based on historical usage data, service level agreements, contracts, resource configurations, and the like. Thus, when the user selects to turn on/off a resource, use a resource for some time, allow the resource to sit idle or off, and perform a variety of other actions, such factors are considered in determining the changes to the recommendations.

In one embodiment, the historical data used might be constrained to using a particular time window of prior time. For example, in some embodiments, the time window of prior time might be between one to four months. However, other time periods might be used. In some determinations of recommendations, it might be determined that a prior usage reflects a predicted future usage over a remaining portion of the contract for a resource. Thus, in one embodiment, if it is determined that historical usage of the resource is at 80% over the prior time period, then it might be assumed that the future usage will also be at 80% for the remaining time period on the contract. However, other models might be used, including, but not limited to using a mode, median, or other statistical parameter from the prior time period, to predict future usage.

Further, in some embodiments, a comparison might be made between a predicted usage and an actual usage of a resource. The comparison might then be used to generate various errors covariance values, or the like, usable to improve future estimates for recommendations. For example, various machine learning models, or the like, might be used that take into account trends in usage, peak usages, or the like.

Moreover, various recommendation models take into account fixed fees and variable fees for a resource, to improve recommendations. Recommendations may be provided for a given cloud service provider's resources, or be determined across a plurality of cloud service providers. For example, recommendations may be provided on how to manage resources for a given cloud service provider, independent of resources of other providers. However, in other embodiments, recommendations may be provided to the user across a plurality of sources of resources, including recommendations that take into account costing differences between providers, and outsourced resources and in-house resources, as well as to assist in deciding when an actual trade-off between paying as one goes and reservations might occur. In this manner, the user may have an improved visibility of total costs for IT resource reservations. In some embodiments, the user might conduct what-if analysis for comparing using in-house resources versus outsourcing, by inputting different assumptions in portion 502 of FIG. 5, in addition to those illustrated.

In one embodiment, the user may further select a time within lower portion 503 in which to expand display of the recommendations. As illustrated in FIG. 5, a selector bar 520 might be provided to enable the user to select a time period to expand upon. However, other mechanisms might be provided, including a button input sequence or combination, an icon selection, a window for inputting a time period, or the like.

In any event, selection of a time period to expand recommendation display may result in a display interface, such as illustrated in FIG. 6. FIG. 6 is one non-limiting, non-exhaustive example, of a user interface 600 usable for providing a purchase listing for a selected time period. As shown, interface 600 may include purchase list 602 and non-usage list 604.

Purchase list 602 provides a recommendation listing of resources that the user might select to purchase or otherwise reserve for the given time period based on recommendations provided through FIG. 5. Also illustrated, in non-usage list 604 that provides to the user a listing, when such condition exists, of resources that are determined to be unused, or otherwise used at a level below some threshold value. The user may then select to release these resources, or otherwise reallocate usage to these resources. The non-usage list 604 is generated in part based on purchase list 602. Thus, reallocation of a non-used or underutilized resource is not expected to immediately change the purchase list contents. However, the list and the recommendations may change over time for future recommendations. In any event, the user is provided with numerous integrated and dynamic recommendations, and interfaces for managing their IT resources, and thereby enabling the user to improve usage of their IT budgets.

For example, using the above subject innovations, the user will be able to determine when to employ on-demand resources versus reserved resources, or on-demand resources versus an in-house service that might, for example, have been purchases (with upfront fees) and incurs on-going fees from such as maintenance, power, network, physical space over time, or the like.

Figure 7:
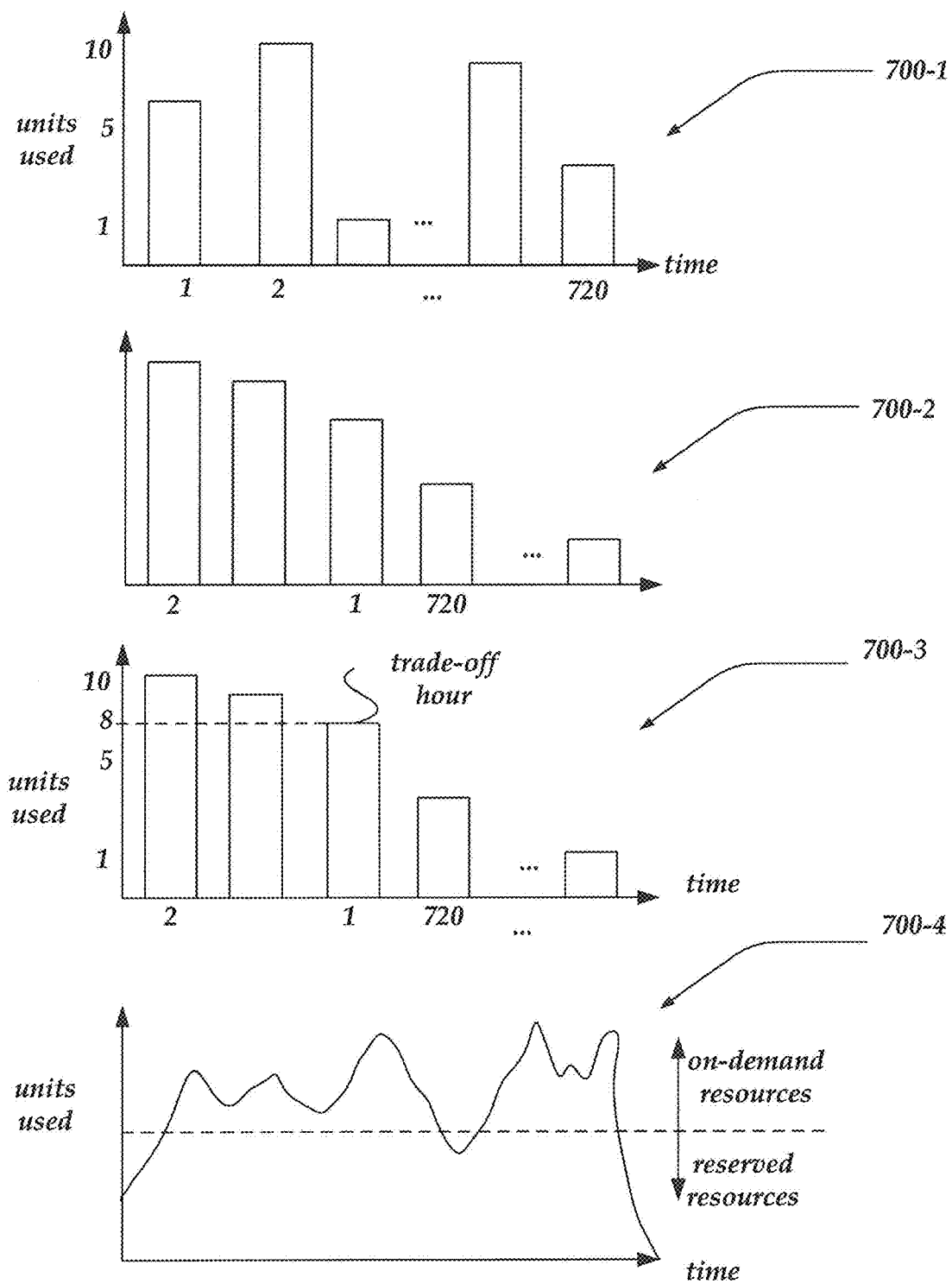
FIG. 7 illustrates one non-limiting, non-exhaustive example of data analysis useable to calculate reserved resources for a single resource type.

As an additional example, FIG. 7 illustrates one non-limiting, non-exhaustive example of data analysis useable to calculate reserved resources for a single resource type. In a complete analysis as performed in block 408 of FIG. 4 many resources types would be analyzed in parallel and summarized for use as in FIG. 5 and FIG. 6. It should be understood that, as discussed above, other approaches may be used, as well as other algorithms. Thus, the following example is not to be construed as limiting or otherwise constraining the subject innovations discussed herein.

In some embodiments, the approach discussed in conjunction with FIG. 7 may be performed within at least block 408 of FIG. 4. However, prior to performing calculations, tracking and collecting historical usage data over some time period is performed, such as is described above at block 406 of FIG. 4. Then, a 4 phase calculation would take place to determine the optimal recommendation. In phase 1, a calculation is performed for on-demand, or cloud usage per unit of time. Referring briefly to FIG. 7, chart 700-1 represents one embodiment for displaying of tracked usage data over time. The unit of time may be defined as virtually any time unit, including hours, other portions of a day, days, weeks, or so forth. The units of resources used may represent discrete resources, or bundled resources. Each unit of time is treated as a bucket and 1 unit is added to the bucket for any resource used during the time period. The result seen in chart 700-1 is a histogram of units used in each time. Once data has been collected for a given previous period of time, the results are used to predict future resource usage. In some embodiments, the data is used to project future resource usage in a time period by assuming it is identical to that of the previous time period data has been collected for. However, as discussed above, other prediction algorithms may be used, including those that take into consideration trends in resource usage, identifying temporary peak usages, or the like.

In chart 700-2, each bucket from chart 700-1 is then sorted from the largest bucket to smallest by unit of time (e.g. hour). Chart 700-2 illustrates one possible display showing rank sorted units for each time period.

In phase two, a calculation is performed to determine a "trade-off percentage" of a given reservation period. This represents the percentage of a time in a period when it costs less to purchase a reservation when cost is amortized over the entire period rather than when using on-demand resources. While a variety of equations may be employed, one such example equation might be:

$$\text{Trade-off percentage} = [U + (RR*TL)]/(ODR*TL)$$

where U represents an upfront cost; RR represents a reserved rate; TL represents a time of reservation; and ODR represents an on-demand rate. Once we have the trade-off percentage, it can be used to calculate a specific number of hours a resource is to be allocated in a time period before it costs less to purchase a reservation when the cost is amortized over the same period. This can be calculated, in one embodiment, using the following equation:

$$\text{Trade-off Hours} = \text{Trade-off percentage} * TL$$

In phase 3, using the results from phases 1 and 2, optimal resources to purchase for a given time may be determined. Chart 700-3 illustrates one embodiment of a display showing a result for determining a trade-off point (e.g., trade-off hour). Once the time bucket is selected using the calculated trade-off hour, that bucket's unit value is then definable, in one embodiment, as the optimal number of resources of the type in question to purchase in the next time period. This is because the number of resources in that bucket represents the number of resources where it is more cost effective to purchase reserved resources over using on-demand resources.

Chart 700-4 shows how once the optimal number of resource reservations has been selected one could allocate resources over a time period. The number of reserved resources would cover all resources during normal operation while on-demand resources would handle resources above the optimal number of resource reservations.

By using phases 1-4 on every type of resource a list of optimal reservation purchases can be obtained and summarized. FIG. 5 and FIG. 6 display how one may visualize the spread of these purchases across a time period. Purchasing resources over time then may reduce the upfront costs associated with purchasing a large number of reservations at once. This also may lower the risk of purchasing many long term reservations by temporarily using on-demand resources for a time even if it's cost-optimal to buy reserved resources. One algorithm to achieve this would be evenly spreading the number of reservations purchased over an entire time period. Others may also be used, as discussed above. In FIG. 5 the recommended costs line is the sum of on-demand rates, upfront-fees and reserved rates for all current resources given recommended purchases and the time the purchase has been recommended in.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer implemented method for modifying a recommendation of an optimal reservation number of computing resources, wherein a server computer having one or more processors, a memory, and a network interface executes logic to perform actions, comprising:
   instantiating a resource recommender program in the memory that performs actions, including:
      tracking historical usage of each of a plurality of the computing resources over time buckets that represent units of time, wherein the tracked historical usage includes: changes in a configuration of the computing resources, up time of the computing resources, down time of the computing resources, and loads placed on the computing resources;
      identifying, by machine learning algorithms temporary peaks in the usage of the computing resources using the tracked historical usage, to predict future computing resource usage over the time buckets, wherein the prediction include determinations of: when to release the computing resources, when to reallocate the computing resources, when to move an in-house resource to a cloud resource, and when to move the cloud resource back to the in-house resource;
      providing, a trade-off percentage of a reservation for each of the computing resources based on a sum of an upfront cost and a reserved rate multiplied by a time of the reservation, the sum further divided by a mathematical product between an on-demand rate and the time of the reservation;
      providing, by using the trade-off percentage, a reservation period of a computing resource, of the plurality of computing resources, wherein the reservation period represents a time before the computing resource costs less to purchase as the reservation when its cost is amortized over the reservation period;
      providing, based on the time buckets further ranked from largest to smallest and the trade-off percentage, a trade-off point representing a number of the computing resources where it is cost effective to purchase reserved computing resources over using on-demand computing resources; and
      determining a recommendation for an optimum forecast model based on the ranked time buckets, the trade-off percentage, the trade-off point, the optimal reservation number of the computing resources over the reservation period, service level agreements, contracts, and the historical usage, wherein the reserved computing resources cover the computing resources during normal operation and the on-demand computing resources cover the computing resources above the optimal reservation number of the computing resources; and instantiating a user interface on a client computer to display the recommendation and also display selectable control elements; and in response to an input provided by a user, immediately and dynamically modifying assumptions of the optimum forecast model for the recommendation to generate a new recommendation that is displayed to the user, wherein the new recommendation is based on the modified assumptions of the optimum forecast model that provide a new estimate of corresponding savings or additional costs when fewer of the computing resources are provided than a previously recommended optimal reservation number of the computing resources over the reservation period from one or more different types of providers for one or more portions of the computing resources to improve an understanding of the new recommendation.

2. The method of claim 1, wherein the recommendation further comprises an indication of how to manage the computing resources across a plurality of different resource providers.

3. The method of claim 1, further comprising generating at least one error covariance value for use in determining other recommendations based on a comparison of a predicted usage of the computing resources with an actual usage of the computing resources.

4. The method of claim 1, further comprising:
receiving at least one user input regarding at least one of a time frame in which the resources are to be committed to by the user, a variation in a parameter of the upfront cost, or the recommended optimal reservation number of computing resources; and as the at least one user input varies, dynamically modifying the recommendation based in part on the at least one user input.

5. The method of claim 1, further comprising:
determining the predicted future usage of the computing resource during a contract; and modifying the recommendation for a remaining time period of the contract based on the predicted future usage of the computing resource.

6. A system for modifying a recommendation of an optimal reservation number of computing resources, the system comprising:
a server computer that includes:
a network interface for communicating over one or more of a wired network or a wireless network with a client computer;
a memory for storing a resource recommender software program; and one or more hardware processors that instantiate and execute the resource recommender software program that is programmed to perform actions, including:
tracking historical usage of each of a plurality of the computing resources over time buckets that represent units of time, wherein the tracked historical usage includes: changes in a configuration of the computing resources, up time of the computing resources, down time of the computing resources, and loads placed on the computing resources;

identifying, by machine learning algorithms temporary peaks in the usage of the computing resources using the tracked historical usage, to predict future computing resource usage over the time buckets, wherein the prediction include determinations of: when to release the computing resources, when to reallocate the computing resources, when to move an in-house resource to a cloud resource, and when to move the cloud resource back to the in-house resource;

providing a trade-off percentage of a reservation for each of the computing resources based on a sum of an upfront cost and a reserved rate multiplied by a time of the reservation, the sum further divided by a mathematical product between an on-demand rate and the time of the reservation;

providing, by using the trade-off percentage, a reservation period of a computing resource, of the plurality of computing resources, wherein the reservation period represents a time before the computing resource costs less to purchase as the reservation when its cost is amortized over the reservation period;

providing, based on the time buckets further ranked from largest to smallest and the trade-off percentage, a trade-off point representing a number of the computing resources where it is cost effective to purchase reserved computing resources over using on-demand computing resources; and determining a recommendation for an optimum forecast model based on the ranked time buckets, the trade-off percentage, the trade-off point, the optimal reservation number of the computing resources over the reservation period, service level agreements, contracts, and the historical usage, wherein the reserved computing resources cover the computing resources during normal operation and the on-demand computing resources cover the computing resources above the optimal reservation number of the computing resources; and instantiating a user interface on a client computer to display the recommendation and also display selectable control elements; and in response to an input provided by a user, immediately and dynamically modifying assumptions of the optimum forecast model for the recommendation to generate a new recommendation that is displayed to the user, wherein the new recommendation is based on the modified assumptions of the optimum forecast model that provide a new estimate of corresponding savings or additional costs when fewer of the computing resources are provided than a previously recommended optimal reservation number of the computing resources over the reservation period from one or more different types of providers for one or more portions of the computing resources to improve an understanding of the new recommendation.

7. The system of claim 6, wherein the recommendation further comprises an indication of how to manage the computing resources across a plurality of different resource providers.

8. The system of claim 6, further comprising generating at least one error covariance value for use in determining other recommendations based on a comparison of a predicted usage of the computing resources with an actual usage of the computing resources.

9. The system of claim 6, further comprising:
receiving at least one user input regarding at least one of a time frame in which the resources are to be committed to by the user, a variation in a parameter of the upfront cost, or the recommended optimal reservation number of computing resources; and
as the at least one user input varies, dynamically modifying the recommendation based in part on the at least one input.

10. The system of claim 6, further comprising:
determining the predicted future usage of the computing resource during a contract; and
modifying the recommendation for a remaining time period of the contract based on the predicted future usage of the computing resource.

11. A non-transitory computer readable storage medium for modifying a recommendation of an optimal reservation number of computing resources, on which is recorded computer executable instructions that, when executed by a server computer that includes a memory, a network interface, and one or more processors, cause the one or more processors to instantiate and execute a resource recommender software program that performs actions, comprising:
tracking historical usage of each of a plurality of the computing resources over time buckets that represent units of time, wherein the tracked historical usage includes: changes in a configuration of the computing resources, up time of the computing resources, down time of the computing resources, and loads placed on the computing resources;
identifying, by machine learning algorithms temporary peaks in the usage of the computing resources using the tracked historical usage to predict future computing resource usage over the time buckets, wherein the prediction include determinations of: when to release the computing resources, when to reallocate the computing resources, when to move an in-house resource to a cloud resource, and when to move the cloud resource back to the in-house resource;
providing, by the one or more processors, a trade-off percentage of a reservation for each of the computing resources based on a sum of an upfront cost and a reserved rate multiplied by a time of the reservation, the sum further divided by a mathematical product between an on-demand rate and the time of the reservation;
providing, by using the trade-off percentage, a reservation period of a computing resource, of the plurality of computing resources, wherein the reservation period represents a time before the computing resource costs less to purchase as the reservation when its cost is amortized over the reservation period;
providing, based on the time buckets further ranked from largest to smallest and the trade-off percentage, a trade-off point representing a number of the computing resources where it is cost effective to purchase reserved computing resources over using on-demand computing resources; and
determining a recommendation for an optimum forecast model based on the ranked time buckets, the trade-off percentage, the trade-off point, the optimal reservation number of the computing resources over the reservation period, service level agreements, contracts, and the historical usage, wherein the reserved computing resources cover the computing resources during normal operation and the on-demand computing resources cover the computing resources above the optimal reservation number of the computing resources; and
instantiating a user interface on a client computer to display the recommendation and also display selectable control elements; and
in response to an input provided by a user, immediately and dynamically modifying assumptions of the optimum forecast model for the recommendation to generate a new recommendation that is displayed to the user, wherein the new recommendation is based on the modified assumptions of the optimum forecast model that provide a new estimate of corresponding savings or additional costs when fewer of the computing resources are provided than a previously recommended optimal reservation number of the computing resources over the reservation period from one or more different types of providers for one or more portions of the computing resources to improve an understanding of the new recommendation.

12. The non-transitory computer readable storage medium of claim 11, further comprising:
receiving at least one user input regarding at least one of a time frame in which the resources are to be committed to by the user, a variation in an upfront cost parameter, or a number of recommended resources to be reserved; and
as the at least one user input varies, dynamically modifying the recommendation for reserving the plurality of resources based in part on the at least one user input.

13. The non-transitory computer readable storage medium of claim 11, further comprising:
determining the predicted future usage of the computing resource during a contract; and
modifying the recommendation for a remaining time period of the contract based on the predicted future usage of the computing resource.

14. The non-transitory computer readable storage medium of claim 11, further comprising:
generating at least one error covariance value for use in determining other recommendations based on a comparison of a predicted usage of the computing resources with an actual usage of the computing resources.

15. The non-transitory computer readable storage medium of claim 11, wherein the recommendation further comprises an indication of how to manage the computing resources across a plurality of different resource providers.

* * * * *